US009706704B2

(12) United States Patent
Ryan et al.

(10) Patent No.: US 9,706,704 B2
(45) Date of Patent: Jul. 18, 2017

(54) PLOUGH ASSEMBLY

(71) Applicant: Ausplow Pty. Ltd., Jandakot (AU)

(72) Inventors: John William Ryan, Jandakot (AU);
Richard Alec Woode, Jandakot (AU);
Carl Bernard Vance, Jandakot (AU)

(73) Assignee: Ausplow Pty. Ltd., Jandakot (AU)

( * ) Notice: Subject to any disclaimer, the term of this patent is extended or adjusted under 35 U.S.C. 154(b) by 0 days.

(21) Appl. No.: 14/468,852

(22) Filed: Aug. 26, 2014

(65) Prior Publication Data
US 2015/0075826 A1    Mar. 19, 2015

(30) Foreign Application Priority Data

Sep. 13, 2013  (AU) ................. 2013903519

(51) Int. Cl.
| A01B 15/02 | (2006.01) |
| A01B 15/20 | (2006.01) |
| A01C 15/00 | (2006.01) |
| A01C 5/06  | (2006.01) |
| A01C 7/06  | (2006.01) |
| A01C 7/20  | (2006.01) |

(52) U.S. Cl.
CPC .............. *A01C 15/00* (2013.01); *A01C 5/062* (2013.01); *A01C 7/06* (2013.01); *A01C 7/203* (2013.01)

(58) Field of Classification Search
CPC ................................ A01B 15/02; A01B 15/20
USPC ........................................................ 172/762
See application file for complete search history.

(56) References Cited

U.S. PATENT DOCUMENTS

| 203,207 A | 4/1878 | Springer |
| 211,601 A | 1/1879 | Springer |
| 221,004 A | 10/1879 | Strayer |
| 252,265 A | 1/1882 | Scofield |
| 322,841 A | 7/1885 | Miskimen |
| 331,753 A | 12/1885 | Arnett |
| 356,340 A | 1/1887 | Valentine |
| 557,046 A | 3/1896 | Bidwell |
| 676,476 A | 6/1901 | Secor |
| 721,306 A | 2/1903 | Hutcherson |
| 886,665 A | 5/1908 | Taylor |
| 998,060 A | 7/1911 | Weikert |
| 1,006,771 A | 10/1911 | Metzler |
| 1,021,042 A | 3/1912 | Heylman |
| 1,031,167 A | 7/1912 | Bushnell |
| 1,104,602 A | 7/1914 | Akers |
| 1,229,194 A | 6/1917 | Patric |
| 1,233,010 A | 7/1917 | Altgelt |
| 1,643,414 A | 9/1927 | Bever |

(Continued)

FOREIGN PATENT DOCUMENTS

| AU | 528237 B2 | 8/1978 |
| AU | 541415 B2 | 12/1981 |

(Continued)

*Primary Examiner* — Gary Hartmann
(74) *Attorney, Agent, or Firm* — Fitch, Even, Tabin & Flannery LLP

(57) ABSTRACT

A digging assembly (10) for a plough. The digging assembly (10) has a digging blade assembly (17) that is moved through the soil to form a slot, and a closing tool assembly (29) that forms a seed bed by partly closing the slot formed by the digging blade assembly (17). Following the closing tool assembly (29) is a seed boot (57) that delivers seed to the seed bed formed by the closing tool assembly (29).

5 Claims, 19 Drawing Sheets

(56) References Cited

U.S. PATENT DOCUMENTS

| | | | | |
|---|---|---|---|---|
| 1,693,318 | A | 11/1928 | Sanders | |
| 2,357,760 | A | 9/1944 | Peacock | |
| 2,736,279 | A | 2/1956 | Johnston | |
| 2,861,527 | A | 11/1958 | Phillips | |
| 2,963,998 | A | 12/1960 | Bliss | |
| 3,148,644 | A | 9/1964 | Keeton | |
| 3,175,622 | A | 3/1965 | Stam | |
| 3,307,508 | A | 3/1967 | Russell | |
| 3,536,145 | A | 10/1970 | Clark | |
| 3,598,069 | A | 8/1971 | Hatcher | |
| 3,673,970 | A | 7/1972 | Hatcher | |
| 3,773,224 | A | 11/1973 | Winslow | |
| 3,777,500 | A * | 12/1973 | Kelley | E02F 5/103 172/101 |
| 3,815,528 | A | 6/1974 | Hawkins | |
| 3,880,100 | A | 4/1975 | Gillies | |
| 3,976,017 | A | 8/1976 | Leffler | |
| 4,023,510 | A | 5/1977 | Sorlie | |
| 4,043,281 | A | 8/1977 | Sorlie | |
| 4,195,697 | A * | 4/1980 | Griffin | A01B 35/26 172/730 |
| 4,422,392 | A | 12/1983 | Dreyer | |
| 4,454,921 | A * | 6/1984 | Schlicker, Jr. | E02F 9/28 172/699 |
| 4,520,742 | A | 6/1985 | Anderson | |
| 4,762,075 | A | 8/1988 | Halford | |
| 4,766,962 | A | 8/1988 | Frase | |
| 4,798,151 | A | 1/1989 | Rodrigues | |
| 4,895,086 | A | 1/1990 | Tye | |
| 4,976,566 | A * | 12/1990 | Yeomans | A01B 15/00 172/751 |
| 5,025,736 | A | 6/1991 | Anderson | |
| 5,161,472 | A | 11/1992 | Handy | |
| 5,224,555 | A | 7/1993 | Bain | |
| 5,310,009 | A | 5/1994 | Rowlett | |
| 5,331,907 | A | 7/1994 | Beaujot | |
| 5,396,851 | A | 3/1995 | Beaujot | |
| 5,417,293 | A | 5/1995 | Leader | |
| 5,425,318 | A | 6/1995 | Keeton | |
| 5,482,121 | A * | 1/1996 | Draney | E02F 5/103 172/165 |
| 5,562,054 | A | 10/1996 | Ryan | |
| 5,579,852 | A | 12/1996 | Woodward | |
| 5,906,166 | A | 5/1999 | Wagner | |
| 6,142,085 | A | 11/2000 | Drever | |
| 6,178,901 | B1 | 1/2001 | Anderson | |
| 6,283,050 | B1 | 9/2001 | Schaffert | |
| 6,516,895 | B2 * | 2/2003 | Yeomans | A01B 15/025 172/744 |
| 6,571,884 | B1 * | 6/2003 | Horvath | A01B 35/225 172/730 |
| 6,945,182 | B1 | 9/2005 | Haukaas | |
| 6,955,131 | B2 | 10/2005 | Beaujot | |
| 7,104,205 | B2 | 9/2006 | Beaujot | |
| D558,237 | S | 12/2007 | Ryan | |
| 7,493,964 | B2 * | 2/2009 | Henry | A01B 35/225 172/730 |
| 8,220,559 | B2 | 7/2012 | Ryan | |
| 8,881,663 | B2 | 11/2014 | Ryan | |
| 2004/0211346 | A1 | 10/2004 | Beaujot | |
| 2009/0014191 | A1 | 1/2009 | Ryan | |
| 2009/0084295 | A1 | 4/2009 | Schaffert | |
| 2011/0142544 | A1* | 6/2011 | Michaelis | E02F 5/101 405/182 |

FOREIGN PATENT DOCUMENTS

| AU | 541415 | 1/1985 |
| AU | 640025 B2 | 6/1990 |
| AU | 675376 B2 | 2/1994 |
| AU | 675376 | 1/1997 |
| AU | 2007202357 A | 6/2006 |
| AU | 2011201476 A1 | 3/2010 |

* cited by examiner

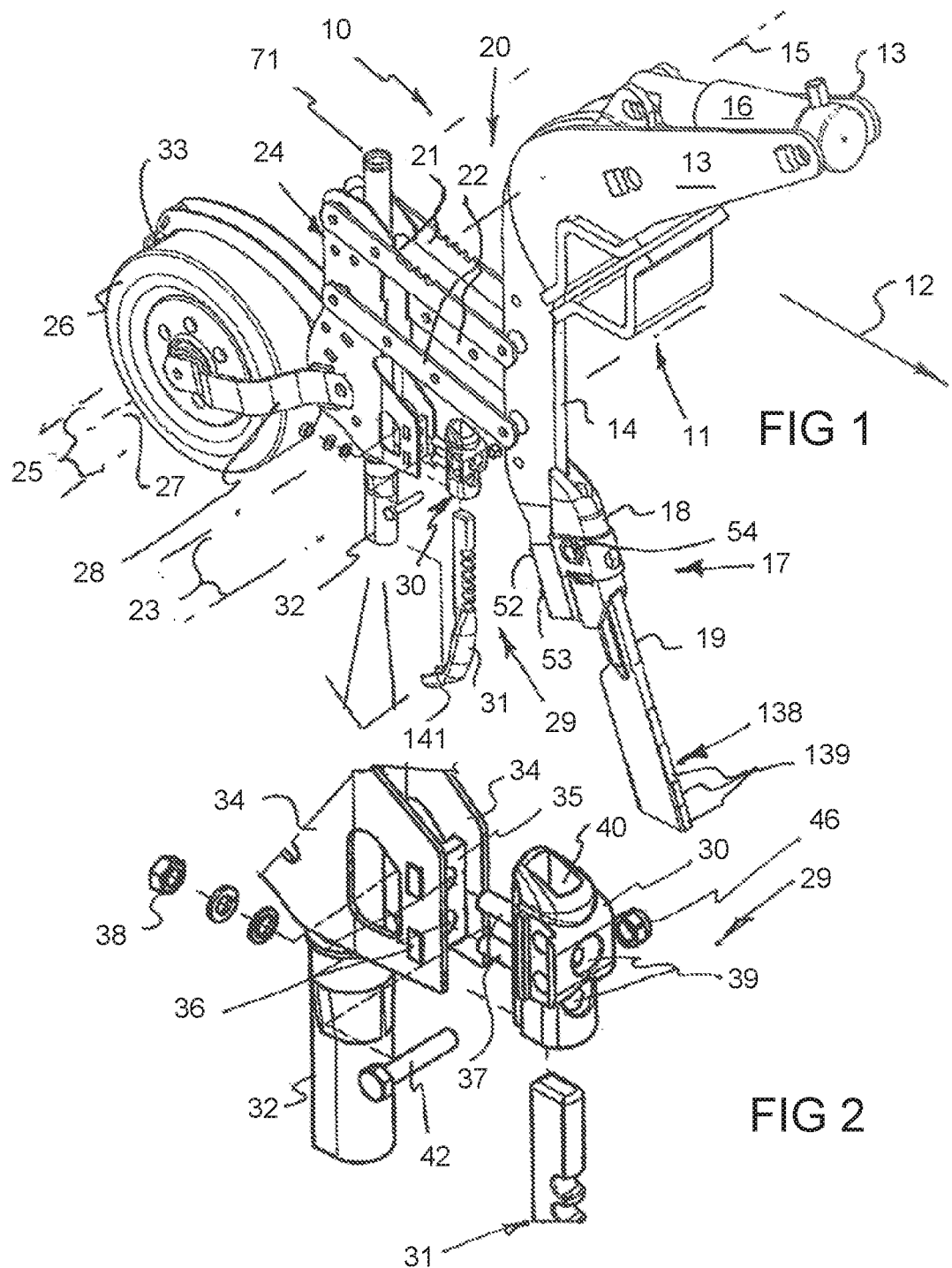

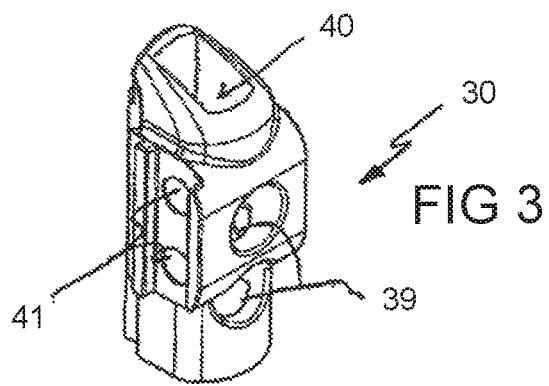
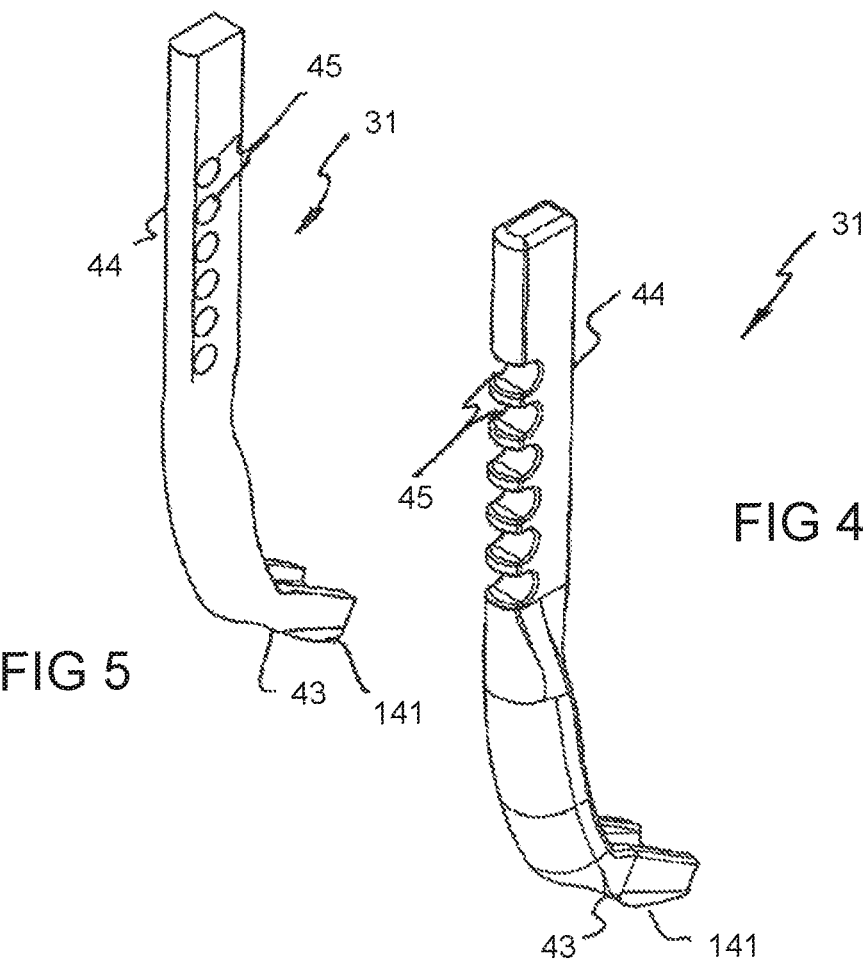

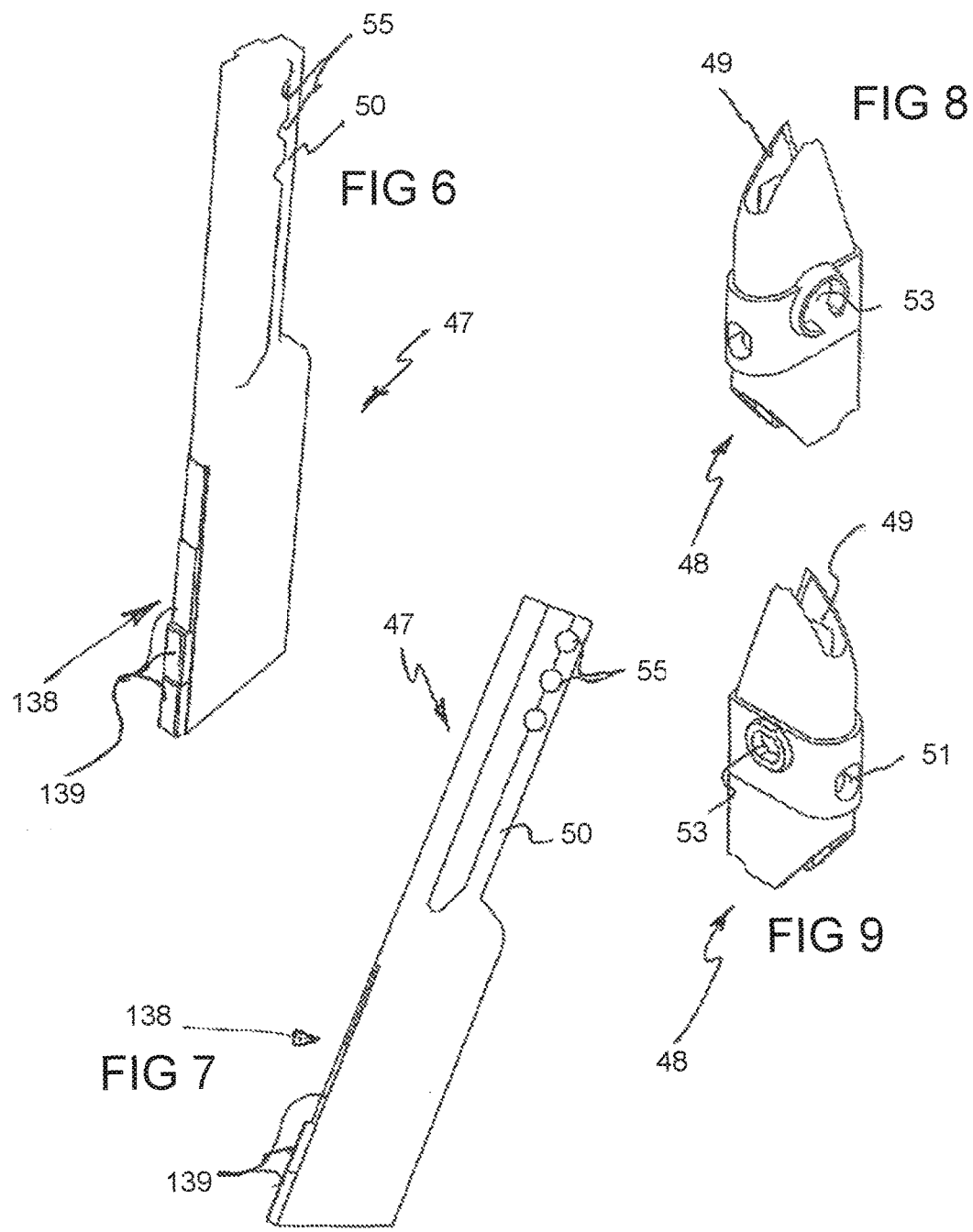

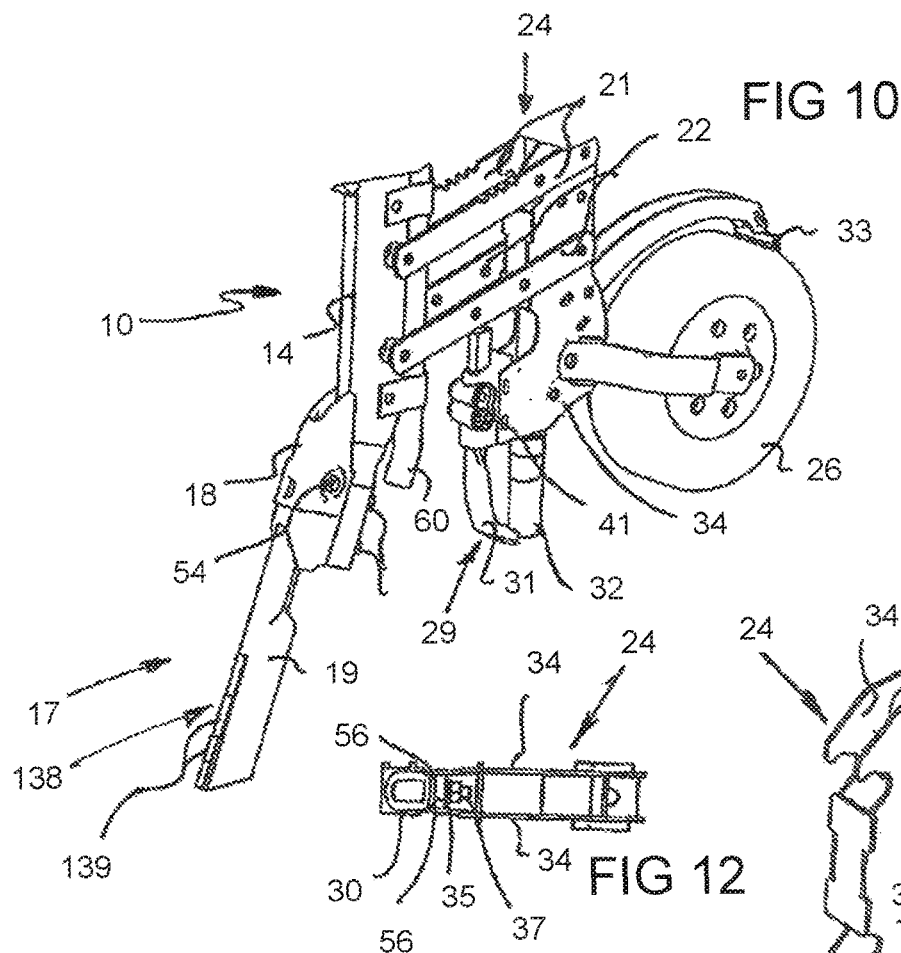
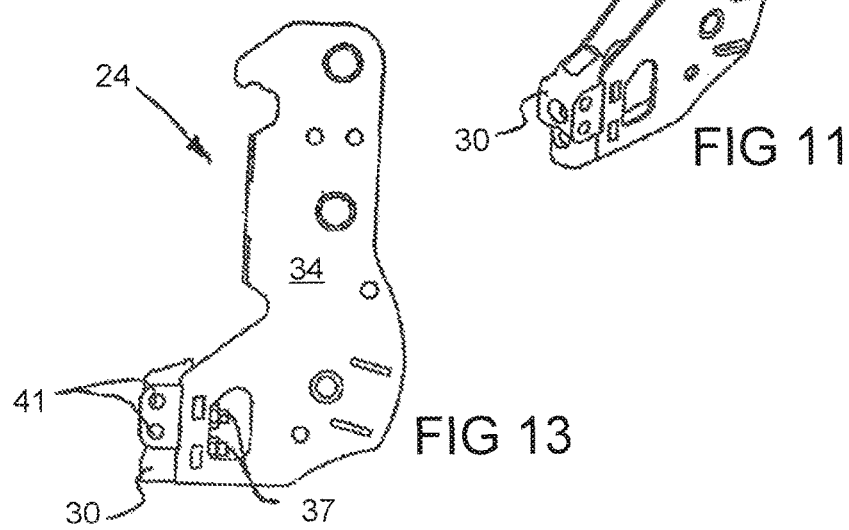

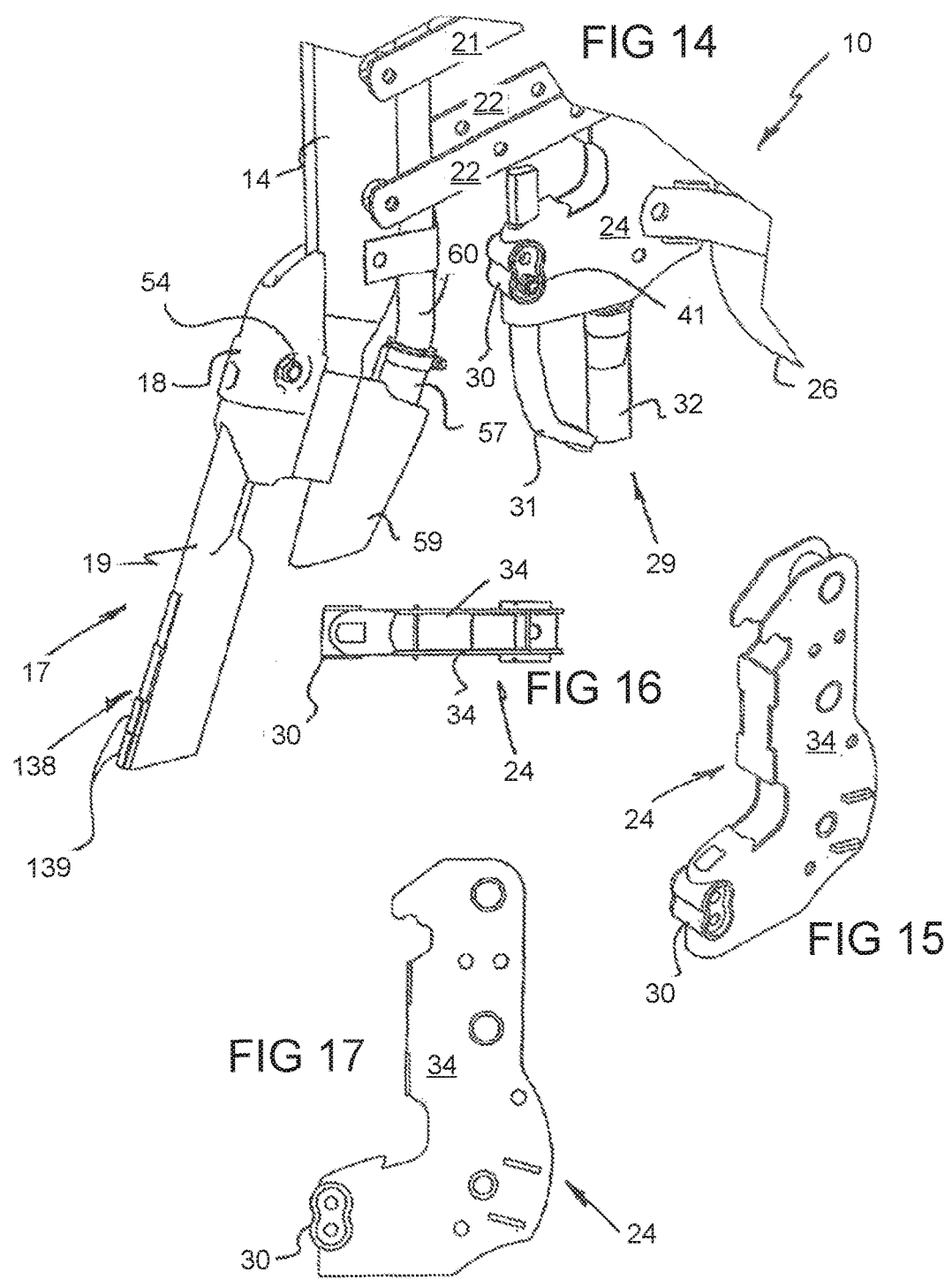

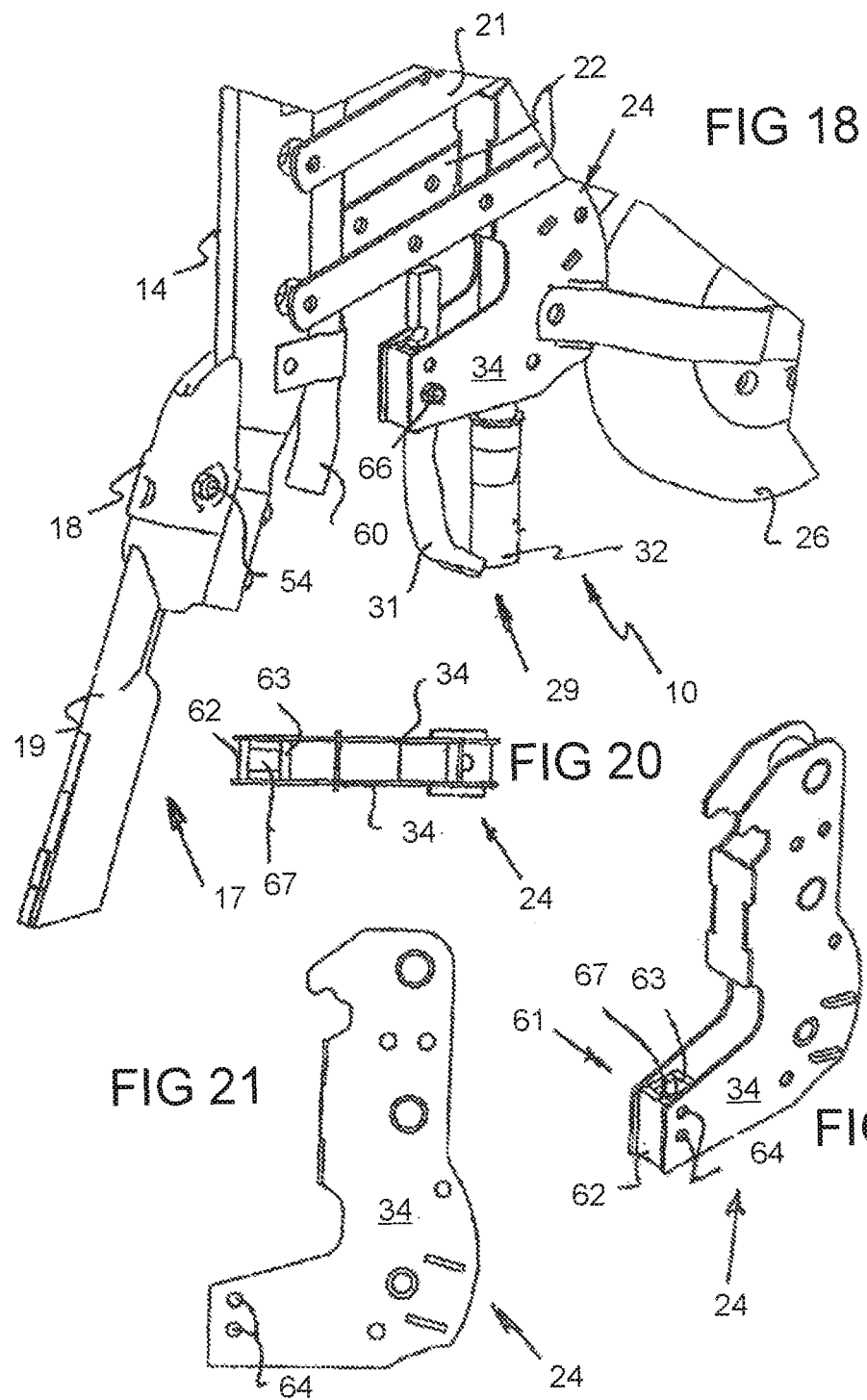

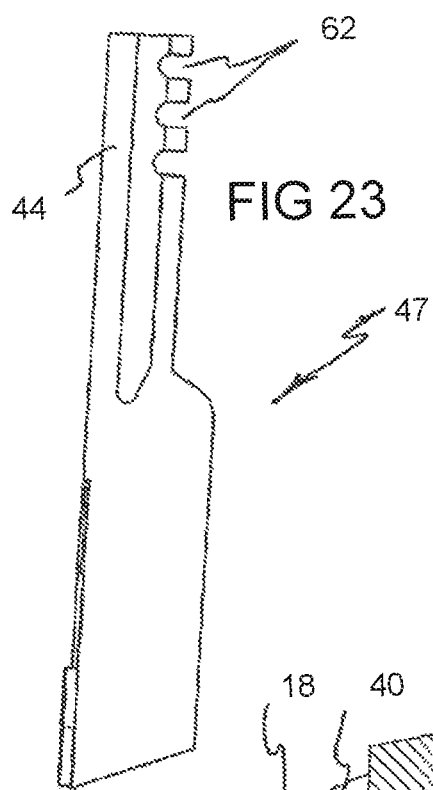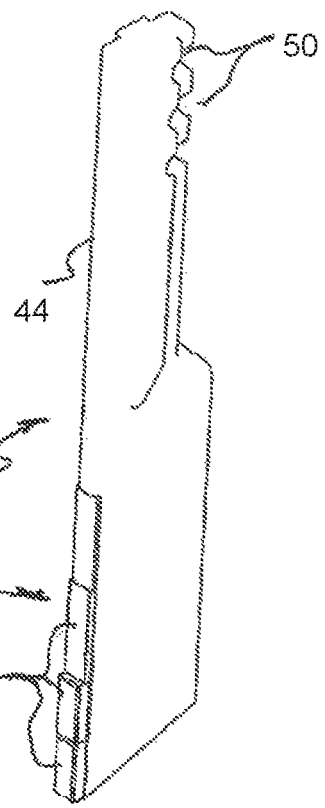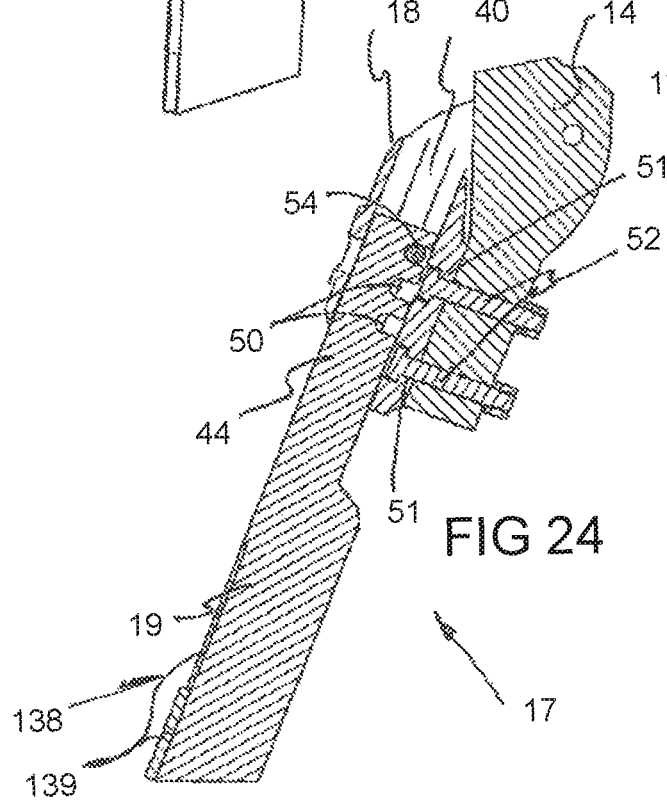

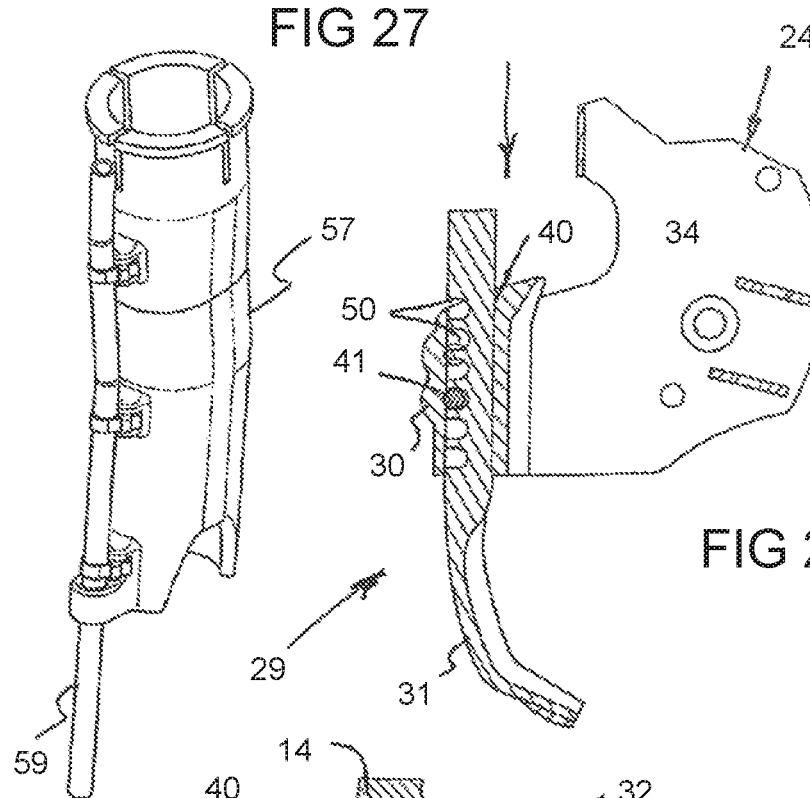
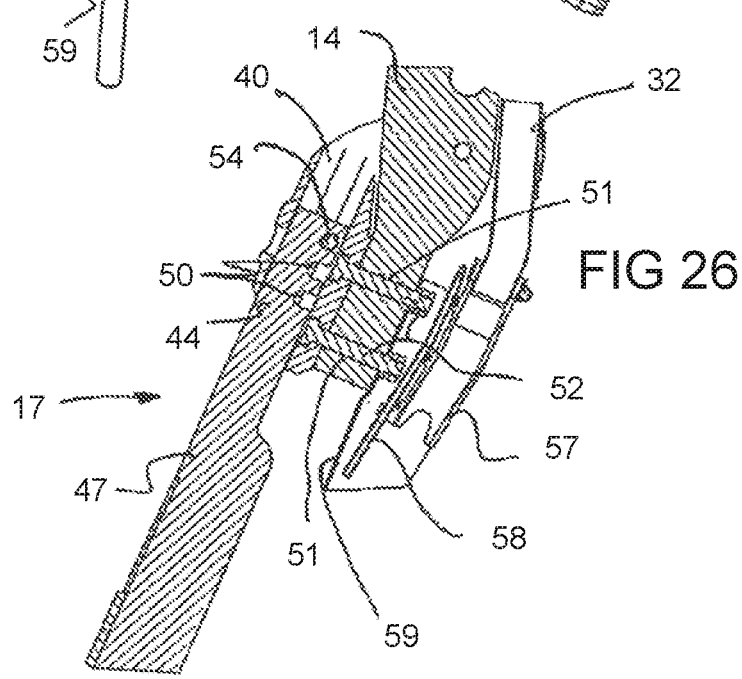

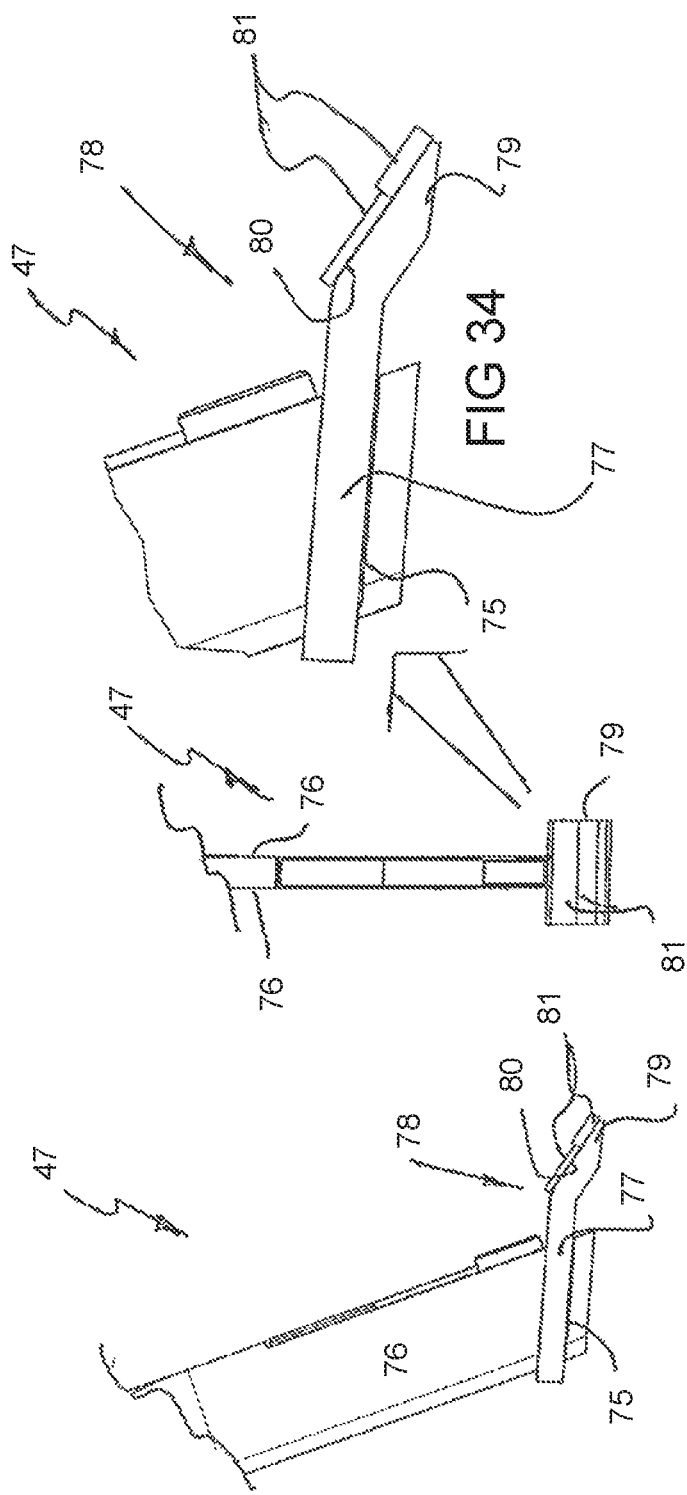

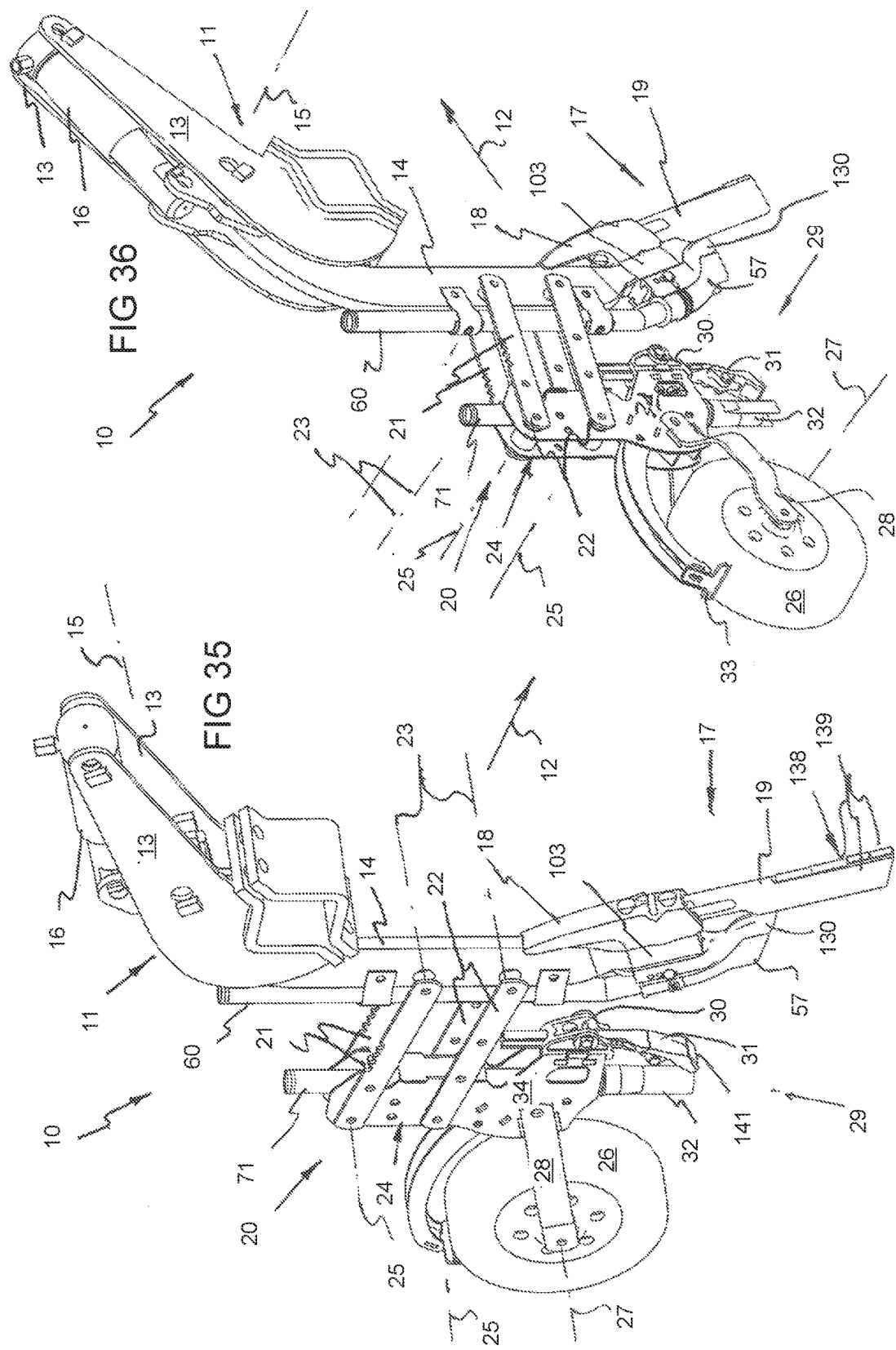

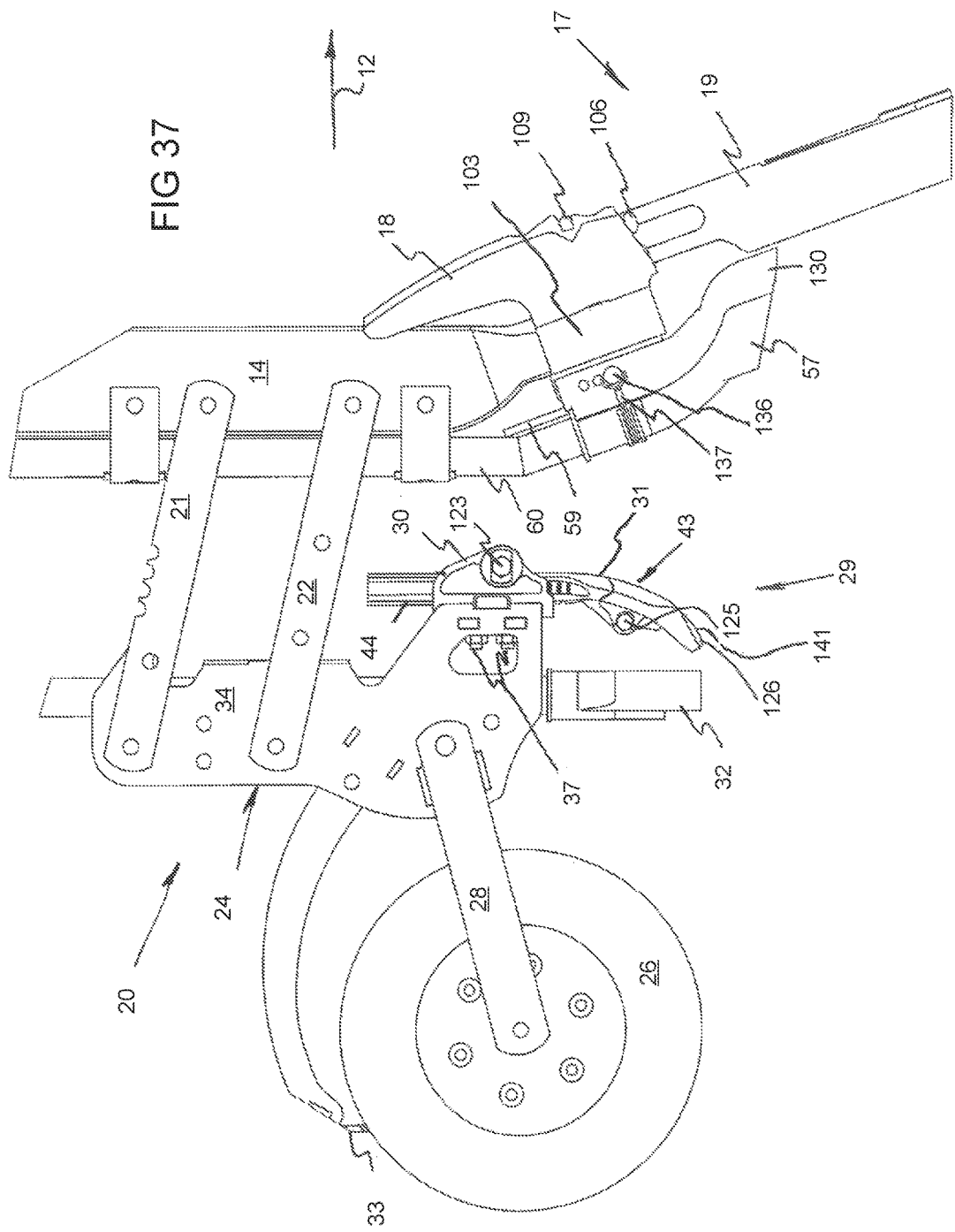

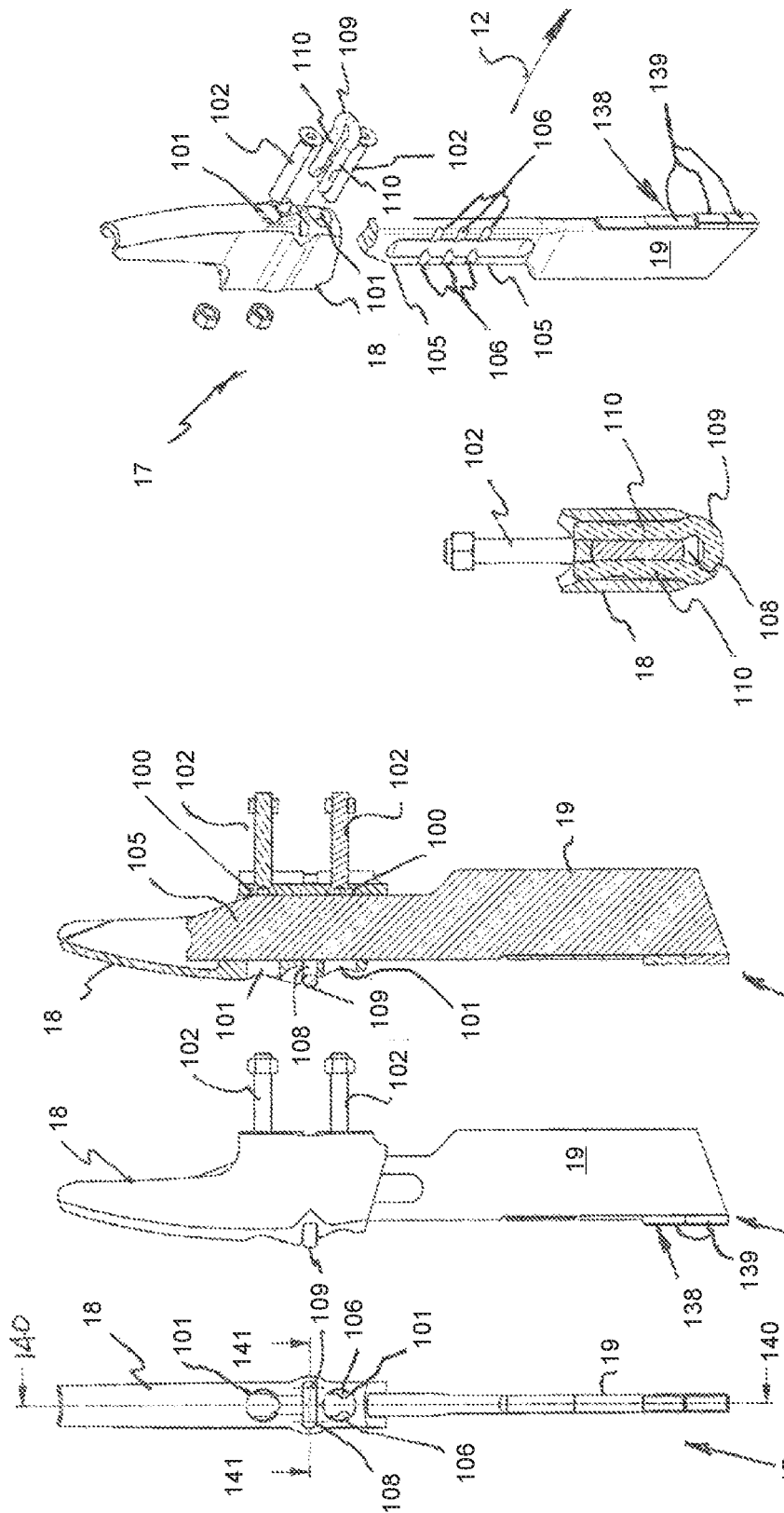

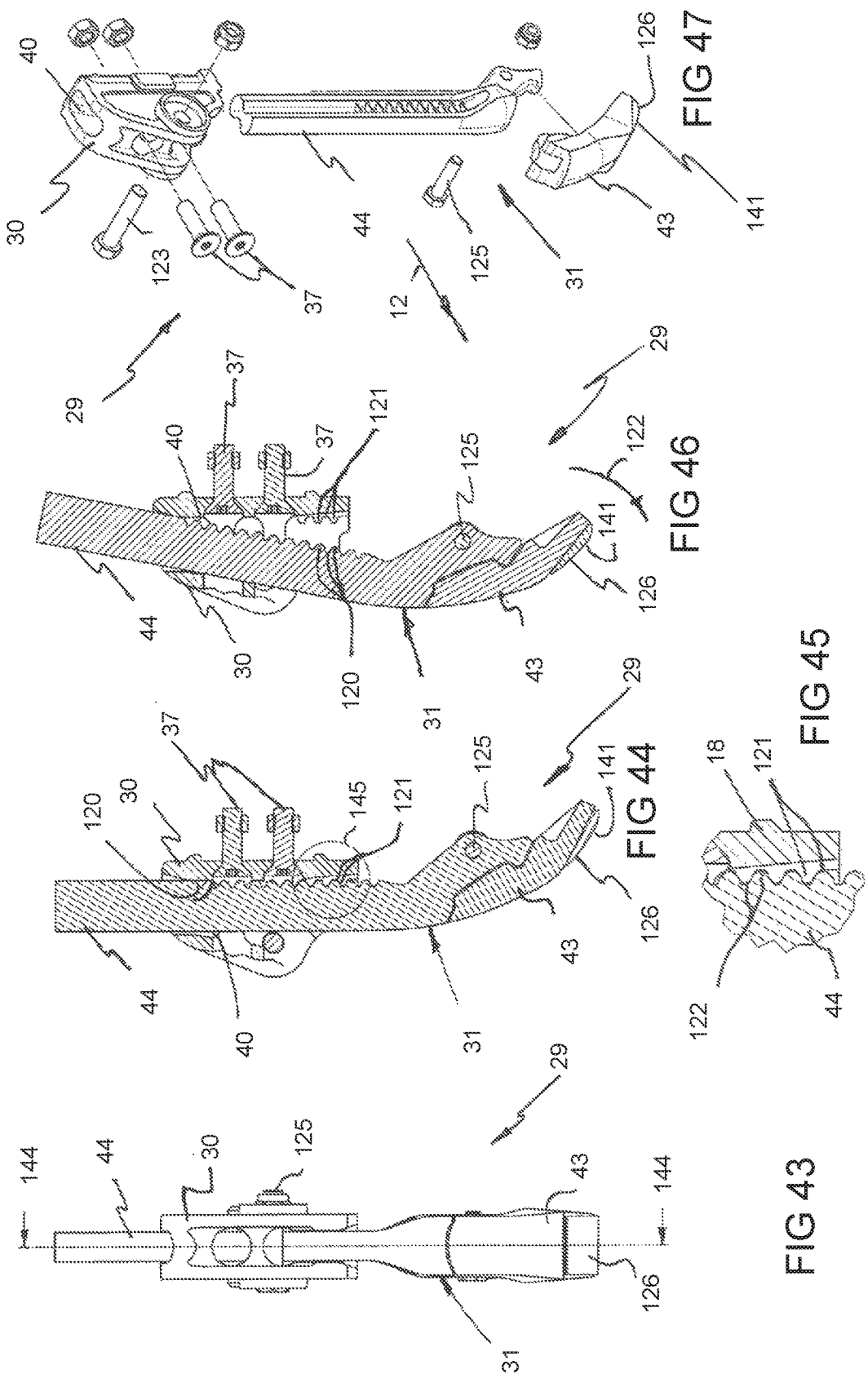

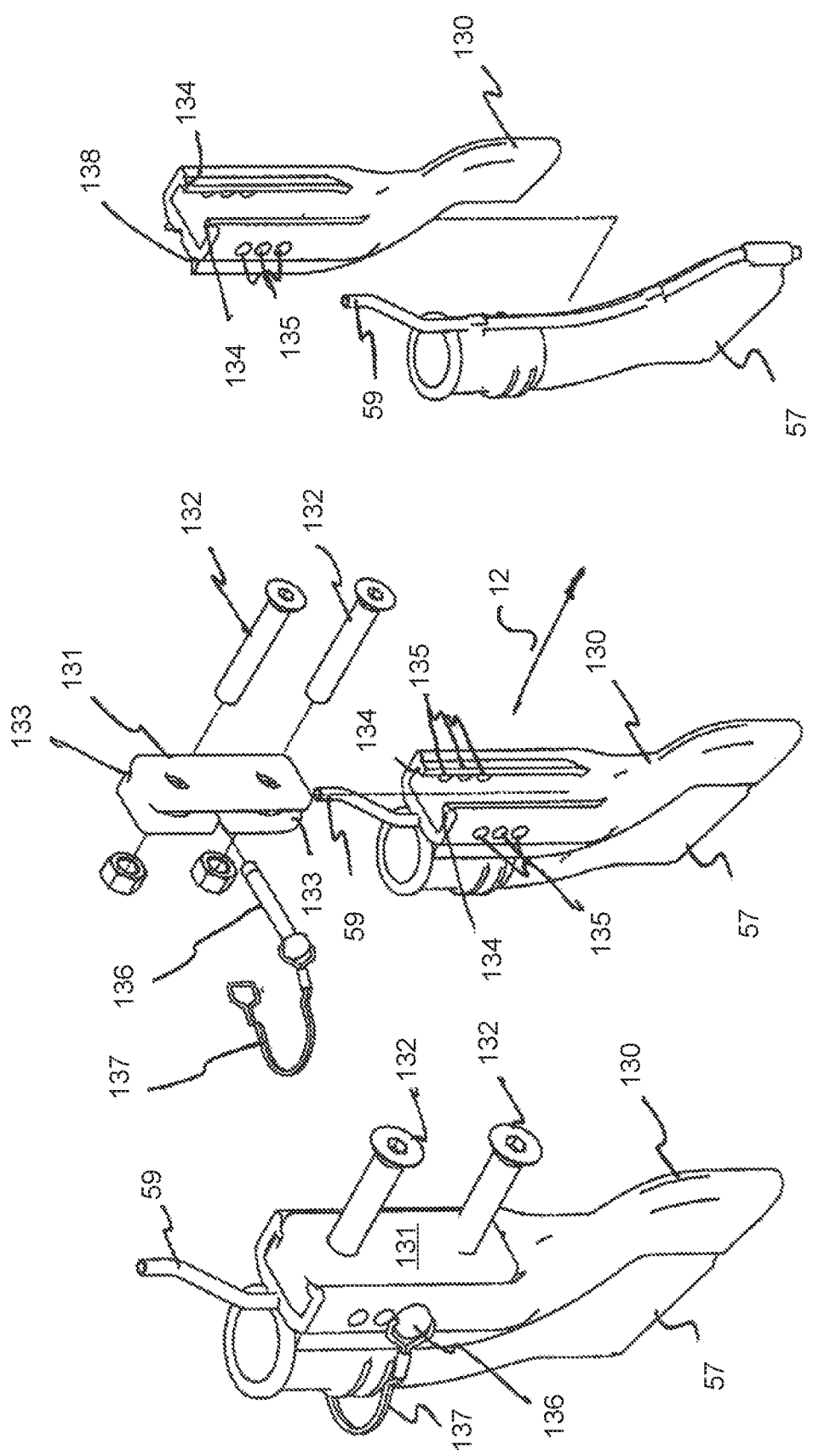

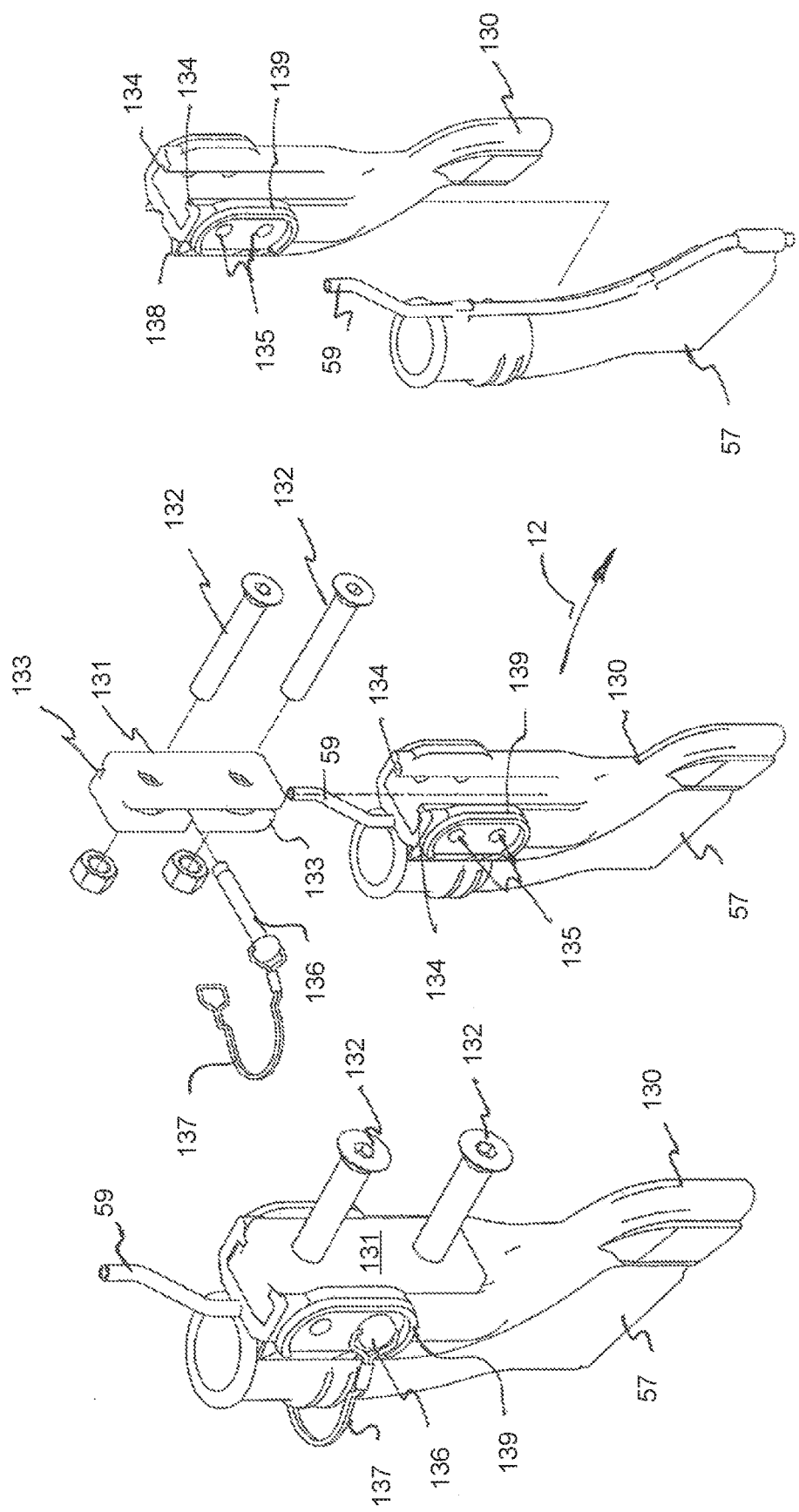

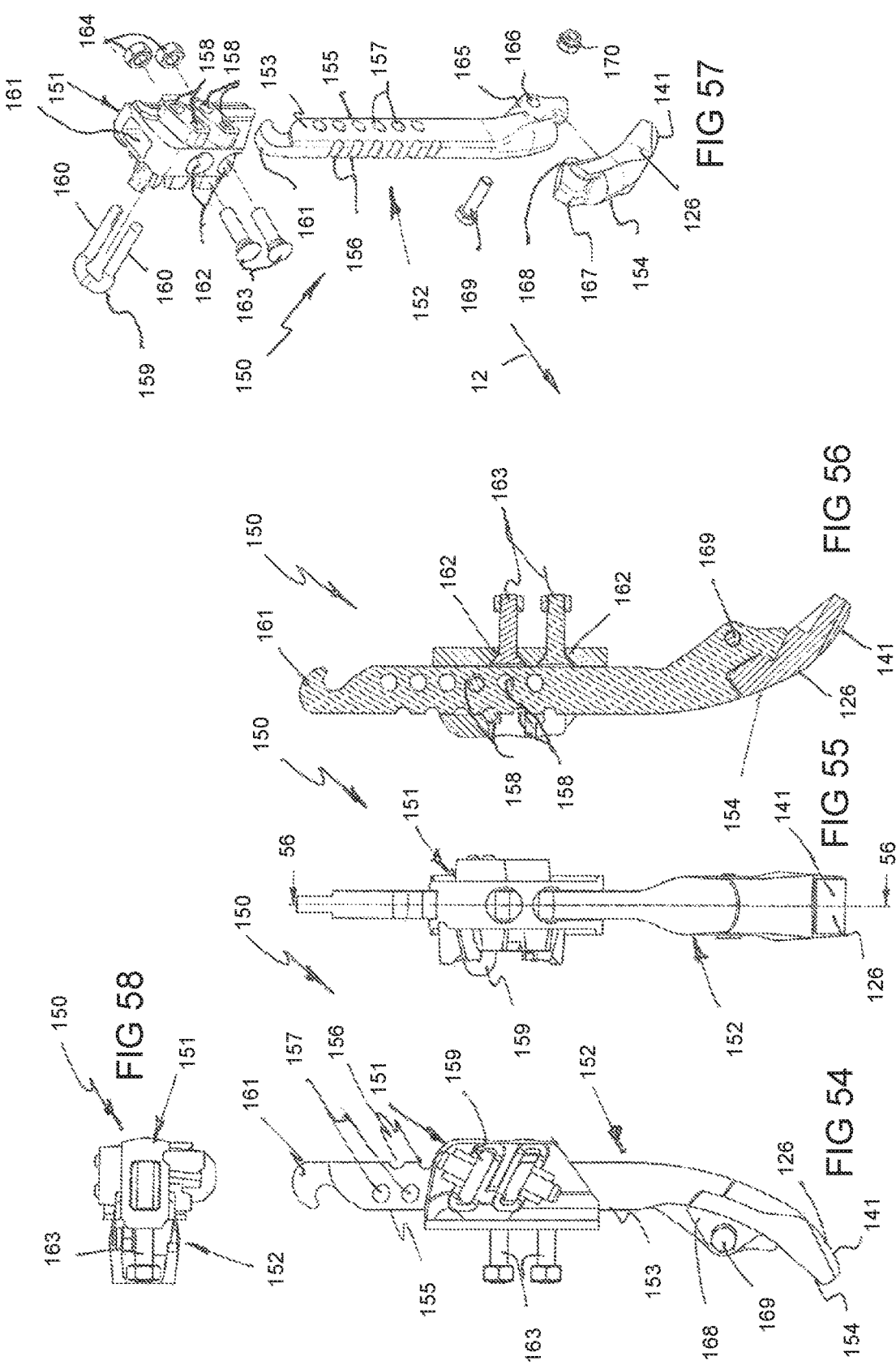

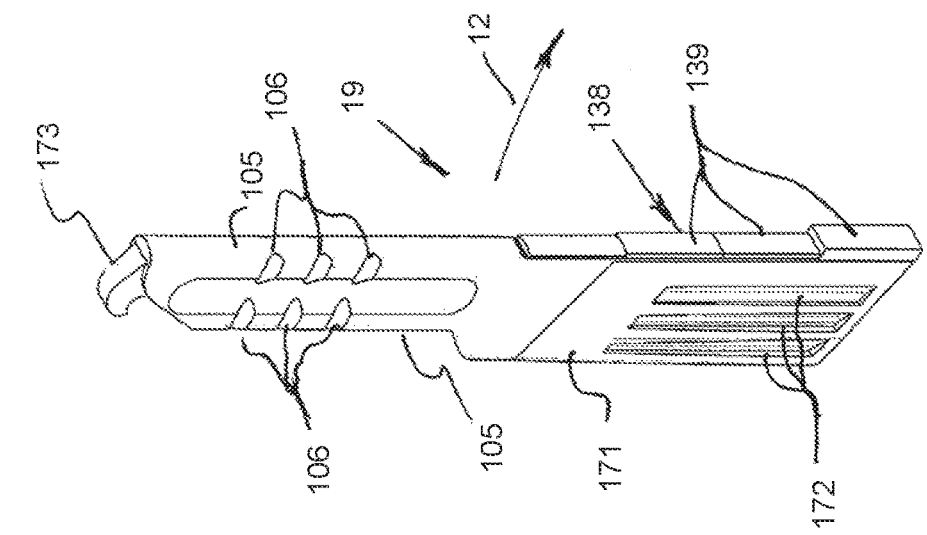
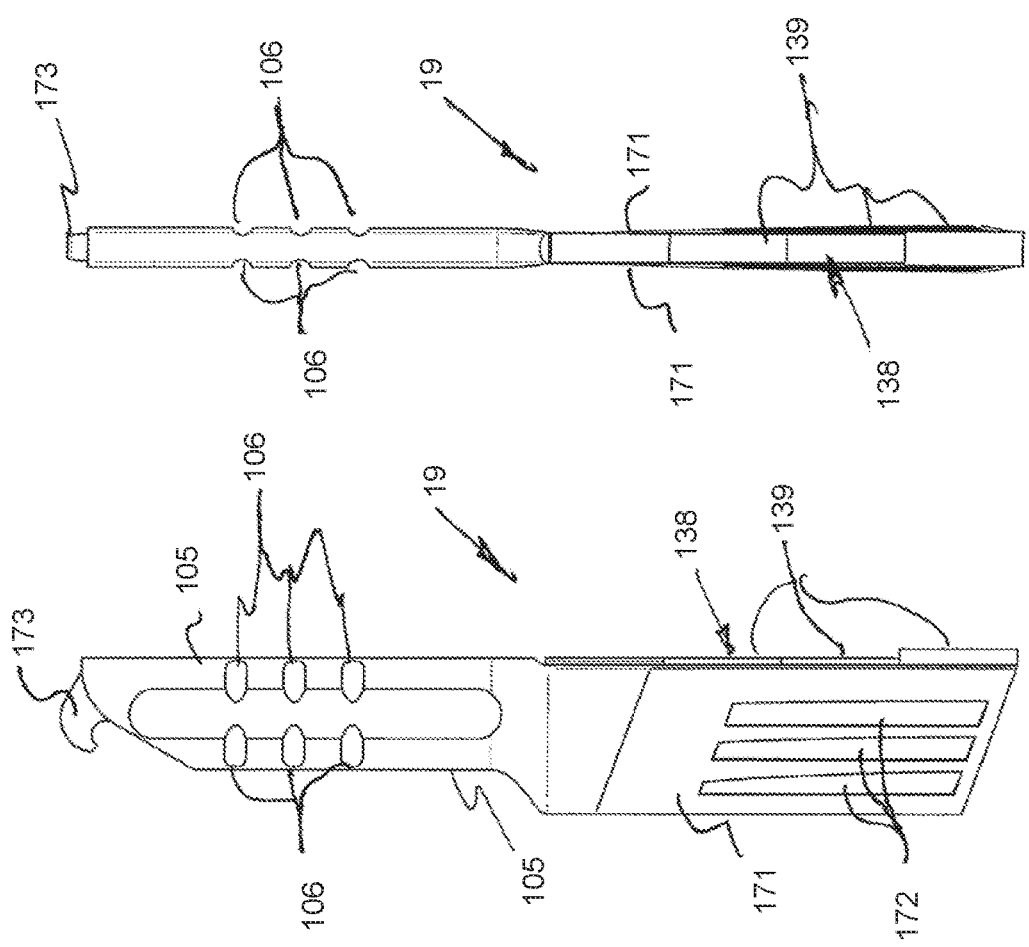
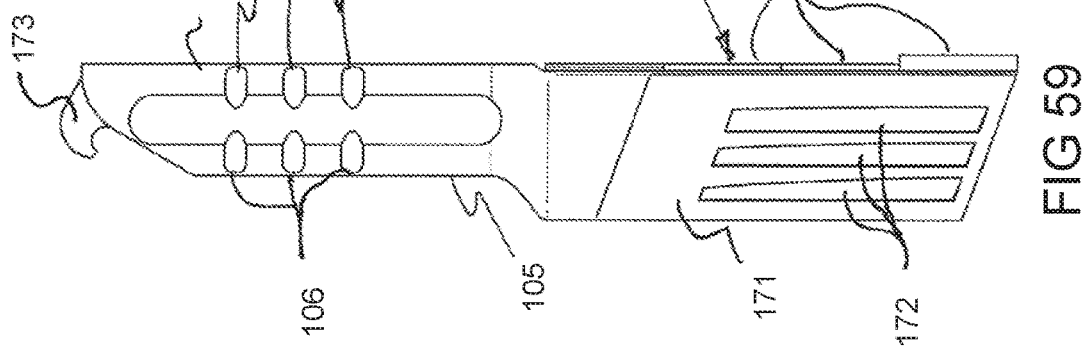

PLOUGH ASSEMBLY

CROSS-REFERENCE TO RELATED APPLICATION

This application claims priority from Australian Patent Application No. 2013903519, filed Sep. 13, 2013, which is hereby incorporated herein by reference in its entirety.

FIELD

The present invention relates to plough assemblies and more particularly to the earth working tools of a plough assembly.

BACKGROUND

Traditionally ploughs were designed to make several passes over the same piece of ground and/or designed to invert the soil before the seed and/or fertiliser was deposited by the soil surface. These known methods resulted in destruction of the soil structure which is detrimental to new growth resulting from germination of a newly planted seed. A further disadvantage is moisture loss.

The plough described in Australian Patent 528237 addressed the above issues. This plough had a digging point to undertake deep tillage, that is fracturing of the soil as opposed to destroying the soil structure. Although the plough described in the above Australian patent addressed issues in respect of maintaining moisture and soil structure, a disadvantage thereof was placement of the seed and preparation of the seed bed.

It is not uncommon for tine seeding machinery and their attachments to experience difficulty in penetrating soil deeply while at the same time maintaining accurate placement of the seed and fertiliser. Due to the uneven ground surface over which ploughs pass, seeding depth was controlled by widely spaced ground rules. A disadvantage of these ploughs was that seeding depth could not be accurately maintained, often resulting in the seed and fertiliser being placed together on a hard soil barrier causing poor seed germination, loss of plant vigour, low yields, poor water penetration, water logging, fertiliser toxicity and a greater incidence of plant disease.

The above problems were addressed by the ploughs described in Australian Patents 541415, 640025, 675376 and 2007202357, as well as Australian Patent Application 2011201476.

A disadvantage of the above described ploughs is that construction of the plough and replacement of wear parts, such as the digging blades and closing tools, is difficult. A still further disadvantage is that the use of power tools is prevented or at least inhibited. This greatly increased the time and therefore cost of construction of the ploughs while making it difficult and therefore time consuming to service.

OBJECT

It is the object of the present invention to overcome or substantially ameliorate at least one of the above disadvantages.

SUMMARY

There is disclosed herein a plough tool to be moved through a soil layer in a forward direction by being attached to a plough frame, the tool being constructed so as to have a forwardly facing surface to engage the soil layer, to prepare the soil layer for the delivery of seed and/or fertiliser to the soil layer, the tool having an upper stem with a passage transverse relative to said direction through which a fastener passes pass to secure the tool to the frame.

Preferably, said passage is a first passage, and said stem includes a plurality of passages, each of the passages extending generally transverse relative to said direction, so that the fastener may pass through a selected one of the passages to select the operating depth of the tool with respect to said soil layer.

Preferably, the passages are slots.

Preferably, the slots are forward or rearwardly open.

In an alternative form, the passages are holes.

There is further disclosed herein a digging assembly including an adaptor in combination with the above tool, wherein the adaptor has a socket within which a portion of the tool projects, with the adaptor including at least one transverse passage within which a fastener is located so as to engage in an aligned one of the tool passages to fix the tool to the adaptor.

Preferably, the adaptor has at least one mounting passage extending through at least part of the adaptor and extending in said direction to receive a fastener to secure the adaptor to the frame.

Preferably, the socket is an upwardly extending passage.

Preferably, the mounting passages extend rearwardly through portion of the adaptor from said socket.

There is further disclosed herein a plough tool and a forward facing surface engages the soil layer, to prepare the soil layer for the delivery of seed and/or fertiliser to the soil layer.

Preferably, the passage is a first passage, and the stem has at least one further passage transverse relative to said direction and through which a fastener passages to secure the stem to the frame.

Preferably, the passages are slots, ridges and/or holes.

There is further disclosed herein, in combination, the plough tool and an adaptor to attach the tool to a frame, the adaptor having a passage that receives portion of the tool, with the adaptor having a plurality of slots, ridges and/or holes to co-operate with the slots, ridges and/or holes of the tool to provide for location of the tool at said desired soil depth.

Preferably, the adaptor provides for securing of the tool in an engaged position with respect to the slots, ridges and/or holes of the tool and adaptor engaged, with the tool being movable to release the tool for movement relative to the adaptor.

Preferably, the adaptor has a transverse passage, and the combination includes a fastener received in said transverse passage to engage the tool to retain the tool in the engaged position, with the fastener being moved to provide for adjustment of the tool relative to the adaptor.

Preferably, the tool is movable relative to the adaptor by angular or linear movement of the tool from the engaged position.

There is further disclosed herein a plough tool to be moved through a soil layer in a forward direction by being attached to a plough frame, the tool being constructed so as to have a forward facing surface to engage the soil layer, to prepare the soil layer for the delivery of seed and/or fertiliser to the soil layer, the tool having an upper stem, the stem having a plurality of slots extending generally in said direction, the slots being provided to enable adjustment of the tool to adjust soil depth.

Preferably, the tool has lateral faces, each of the faces being provided with said slots, with the slots being arranged in pairs, each pair consisting of a slot from each of the lateral faces, and wherein the pairs are arranged at locations along the tool to provide for height adjustment of the tool.

There is further disclosed herein, in combination, the plough tool and an adaptor, and wherein the adaptor has a passage into which the tool projects, with the adaptor also having at least one passage extending substantially in said direction that receives a pin that engages one of the slots to retain the tool at a desired height.

Preferably, the adaptor has a pair of passages, each passage receiving portion of a clip.

Preferably, the tool is a closing tool.

In an alternative preferred form, the tool is a digging blade.

BRIEF DESCRIPTION OF DRAWINGS

Preferred forms of the present invention will now be described by way of example with reference to the accompanying drawings wherein:

FIG. 1 is a parts exploded isometric view of a digging assembly of a plough;

FIG. 2 is a schematic enlarged isometric view of a closing tool adaptor portion of the digging assembly of FIG. 1;

FIG. 3 is a schematic isometric view of the closing tool adaptor employed in the digging assembly of FIG. 1;

FIG. 4 is a schematic isometric view of the closing tool of the digging assembly of FIG. 1;

FIG. 5 is a schematic isometric view of an alternative closing tool to the closing tool of FIG. 4;

FIG. 6 is a schematic isometric view of a digging blade employed in the digging assembly of FIG. 1;

FIG. 7 is a schematic side elevation of the digging blade of FIG. 6;

FIG. 8 is a schematic isometric view of an adaptor to mount the digging blade of FIG. 6 in the assembly of FIG. 1;

FIG. 9 is a further schematic isometric view of the adaptor of FIG. 8;

FIG. 10 is a schematic isometric view of a modification of the digging assembly of FIG. 1;

FIG. 11 is a schematic isometric view of a mounting employed in the digging assembly of FIG. 10;

FIG. 12 is a schematic top plan view of the mounting of FIG. 11;

FIG. 13 is a schematic side elevation of the mounting of FIG. 11;

FIG. 14 is a schematic isometric view of a still further modification of the digging assembly of FIG. 1;

FIG. 15 is a schematic isometric view of a mounting employed in the digging assembly of FIG. 14;

FIG. 16 is a schematic top plan view of the mounting of FIG. 15;

FIG. 17 is a schematic side elevation of the mounting of FIG. 15;

FIG. 18 is a schematic isometric view of a still further modification of the digging assembly of FIG. 1;

FIG. 19 is a schematic isometric view of a mounting employed in the digging assembly of FIG. 18;

FIG. 20 is a schematic top plan view of the mounting of FIG. 19;

FIG. 21 is a schematic side elevation or the mounting of FIG. 19;

FIG. 22 is a schematic isometric view of a digging blade employed in the assembly of FIG. 18;

FIG. 23 is a schematic side elevation of the digging blade of FIG. 22;

FIG. 24 is a schematic sectioned side elevation of the blade of FIGS. 22 and 23 mounted in the assembly of FIG. 18;

FIG. 25 is a schematic sectioned side elevation of a closing tool secured in the mounting of FIG. 11;

FIG. 26 is a schematic sectioned side elevation of the digging blade and mounting of FIG. 16;

FIG. 27 is a schematic isometric view of a fertilizer delivery tube employed in the assembly of FIG. 14;

FIG. 32 is a schematic side elevation of a modification of the digging blade of FIG. 22;

FIG. 33 is a schematic front elevation of the blade of FIG. 32;

FIG. 34 is a schematic enlarged view of the lower portion of the blade of FIG. 32;

FIG. 35 is a schematic isometric view of a modification of the digging assembly of FIG. 1;

FIG. 36 is a further schematic isometric view of the digging assembly of FIG. 35;

FIG. 37 is a schematic side elevation of the digging assembly of FIG. 35;

FIG. 38 is a schematic front elevation of a digging blade and adapter of the assembly of FIG. 35;

FIG. 39 is a schematic side elevation of the digging blade and adapter of FIG. 38;

FIG. 40 is a schematic sectioned side elevation of the digging blade and adapter of FIG. 38 sectioned along the line 141-141;

FIG. 41 is a schematic sectioned plan view of the digging blade and adapter of FIG. 38 sectioned along the line 140-140;

FIG. 42 is a schematic parts exploded isometric view of the adapter and digging blade of FIG. 38;

FIG. 43 is a schematic front elevation of a closing tool and adapter of the digging assembly of FIG. 35;

FIG. 44 is a schematic sectioned side elevation of the closing tool and adapter of FIG. 43 sectioned along the line 144-144;

FIG. 45 is a schematic enlarged sectioned view of the portion 145 of FIG. 44;

FIG. 46 is a further schematic sectioned side elevation of the closing tool and adaptor of FIG. 43;

FIG. 47 is a schematic parts exploded isometric view of the adaptor and closing tool of FIG. 43;

FIG. 48 is a schematic isometric view of a seeding booth of the digging assembly of FIG. 35;

FIG. 49 is a schematic parts exploded isometric view of the fertilizer booth of FIG. 48;

FIG. 50 is a further schematic parts exploded isometric view of portion of the seeding booth of FIG. 48;

FIG. 51 is a schematic isometric view of a modification of the seeding booth of FIG. 48;

FIG. 52 is a schematic parts exploded isometric view of the booth of FIG. 51;

FIG. 53 is a further schematic isometric view of portion of the booth of FIG. 51;

FIG. 54 is a schematic side elevation of a further closing tool and adaptor;

FIG. 55 is a schematic front elevation of the closing tool and adaptor of FIG. 54;

FIG. 56 is a schematic sectioned side elevation of the closing tool as seen in FIG. 55 sectioned along the line 56-56;

FIG. 57 is a schematic parts exploded isometric view of the closing tool of FIG. 54;

FIG. 58 is a schematic top plan top plan view of the closing tool and adaptor of FIG. 54;

FIG. 59 is a schematic side elevation of a modification of the digging blade of FIG. 38;

FIG. 60 is a schematic front elevation of the digging blade of FIG. 59; and

FIG. 61 is a schematic isometric view of the digging blade of FIG. 59.

DESCRIPTION OF EMBODIMENTS

Figure 28:
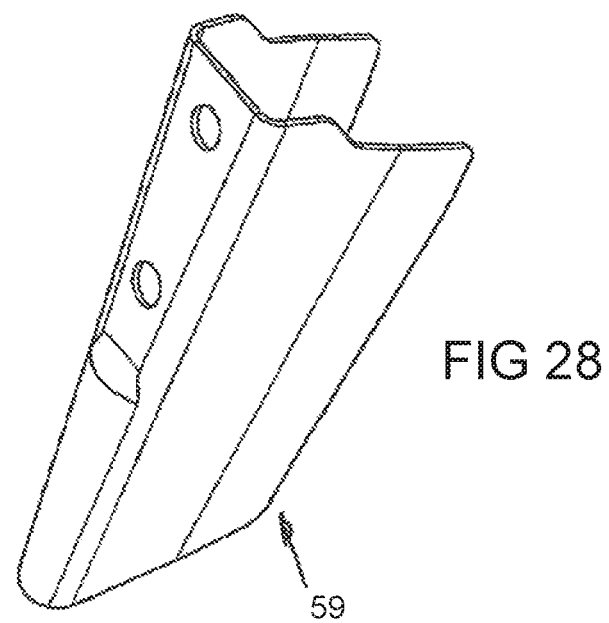
FIG. 28 is a schematic isometric view of a shield employed with the fertilizer tube of FIG. 26.

In FIGS. 1 and 2 of the accompanying drawings there is schematically depicted a digging assembly 10 of a plough, the plough is not fully illustrated. Typically the plough would be moved by a prime mover in a forward direction 12 over a soil layer, with the plough frame including a plurality of beams transverse of the direction 12 and to which a plurality of the digging assemblies 10 would be attached.

The assembly 10 includes a clamp 11 that would secure the assembly 10 to one of the above described beams, so that the assembly 10 is moved in the forward direction 12. The clamp 11 includes a pair of plates 13 that pivotally support a tine 14 for pivoting movement about an axis 15 generally transverse relative to the direction 12. Extending between an upper portion of the tine 14 and the clamp 11 is a hydraulic cylinder 16 that urges the tine 14 to a desired orientation penetrating a soil layer.

Should the assembly 10 engage an object, the tine 14 is permitted to pivot rearwardly so as to overcome the object.

Fixed to a lower portion of the tine 14 is a digging blade assembly 17 including an adaptor 18 fixing a digging blade (tool) 19 to the tine 14. The blade 19 has a forward facing surface 138 (facing in the direction 12) provided by the wear plates 1349. The surface 138 engages the seal, the surface 138 inclined upwardly and rearwardly by an acute angle to the horizontal.

Pivotally attached to trailing edges of the tine 14 is a parallelogram mechanism 20, with the mechanism 20, in this embodiment, including two pairs of linkages 21 and 22. The linkages 21 and 22 are pivotally attached to the tine 14 for angular movement about axes 23 that are generally parallel to the axis 15 and therefore transverse relative to the direction 12.

The trailing portions of the linkages 21 and 22 are pivotally attached to a mounting 24 so that the mounting 24 can move relative to the linkages 21 and 22 about parallel axes 25. The axes 25 are parallel to the axes 23. Operation of the parallelogram mechanism 20 ensures that the mounting 24 is maintained in a generally upwardly extending orientation.

Fixed to the mounting 24 is a press wheel 26 that is mounted for rotation about an axis 27. The axis 27 is generally parallel to the axes 23 and 25. The press wheel 26 is fixed to the mounting 24 by means of arms 28. The press wheel 26 engages the upper surface of the soil layer in order to maintain the mounting 24 at a desired height relative to the soil layer.

Fixed to a forward portion of the mounting 24 is a closing tool assembly 29. The closing tool assembly 29 includes a closing tool adaptor 30 that fixes a closing tool 31 to the mounting 24. As the closing tool 31 is fixed to the mounting 24, the press wheel 26 governs the depth at which the closing tool 31 is located in the soil. The closing tool has a wear plate 140 providing a surface 141. The surface 141 engages the soil to form the seed bed, and is upwardly and forwardly inclined by an acute angle to the horizontal.

Following the closing tool 31 is a seed delivery tube 32. As the tube 32 is fixed relative to the tool 31, the seed is delivered to the seed bed prepared by the closing tool 13.

Preferably a fertilizer tube 60 would follow the blade 19, with the blade 19 fracturing the soil and providing a slot into which the fertilizer is delivered. The closing tool 31 would then partly close the slot so as to form a seed bed upon which seed is delivered by the tube 32. The blade 19, fertilizer tube 60, closing tool 31 and tube 32 are aligned in the direction 12.

Engaged with the radially outer peripheral surface of the wheel 26 is a scraper blade 33 that removes soil that may adhere to the outer surface of the wheel 26.

The press wheel 26, in combination with the mounting 24 and links 21 and 22, cooperate to maintain the closing tool 31 at a desired depth so that the seed bed formed is approximately 40 to 50 mm below the soil surface.

The mounting 24 includes a pair of generally parallel plate 34 that are fixed together, so as to be maintained in the configuration as illustrated. A forward portion of the mounting 24 includes a transverse flange 35 having a pair of passages 36. The passages 36 are forwardly facing and receive bolts 37. The bolts 37 pass through passages 39 in the adaptor 30, with nuts 38 engaging the bolts 37 so as to fix the adaptor 30 to the flange 35 and therefore the mounting 24.

The adaptor 30 acts as a socket by including an upwardly oriented passage 40 into which the closing tool 31 projects.

The adaptor 30 further includes two passages 41 that are transverse relative to the direction 12. A bolt 42 is inserted through a selected one of the passages 41 to secure the closing tool 31 to the adaptor 30.

In the embodiment of FIG. 4, the closing tool 31 includes a lower seed bed forming portion 43 and an upper stem 44. The stem 44 includes a plurality of transverse passages 45 which, in this embodiment, are in the form of slots or notches. The slots open rearwardly relative to the direction 12. However the slots may also be forwardly open. The passages 41 are spaced by 1½ times the pitch of the passages 45. Accordingly by selecting one of the passages 45 and aligning it with a respective one of the passages 41, and inserting the bolt 42, the closing tool 31 is located at a desired depth. Changing the passage 45, and/or passage 41, engaged by the bolt 42 adjusts the height of the tool 31.

In the embodiment of FIG. 5, the passages 45 are holes through the stem 44. The portion 43 of the closing tool 31 may be configured as described in Australian Patent Application 2011201476.

The closing tool 31 is maintained in a desired orientation by having the stem 44 secured within the passage 40 of the adaptor 30 by the fasteners 42 and the nut 46 passing through one of the passages 41.

The above described wheel 26 also aids in closing soil over a seed bed.

The blade assembly 17 includes a digging blade (tool) 47 that is received with an adaptor 48 so as to be secured thereto. The adaptor 48 provides a socket within which the blade 47 is received. More particularly the adaptor 48 has an upwardly oriented passage within which the stem 50 of the blade 47 is received. The adaptor 48 also has a pair of passages that face forwardly with each of the passages receiving a bolt 52 that secures the adaptor 48 to the lower end of the tine 14. The adaptor 48 also has a transverse passage 53 through which a bolt 54 passes to secure the blade 47 to the adaptor 48.

In the embodiment of FIGS. 6 and 7, the stem 50 has a plurality of passages 55, with the passages 55 in this embodiment being holes. The bolt 54 goes through a selected one of the passages 55 to locate the blade 47 at a desired height. By changing the passage 55 adjusts the height of the blade 47.

The blade 47 is positioned so as to be inclined by an acute angle to the horizontal so as to be upwardly rearwardly inclined relative to the direction 12.

In the embodiment of FIGS. 22, 23 and 24, the passages 55 are transverse slots that are open rearwardly relative to the direction 12. However the slots may also face rearwardly.

In the embodiment of FIGS. 10 to 13, the mounting 24 and adaptor 30 have been modified. The mounting 24 includes inwardly inclined flange portions 56 that abut a rear face of the adaptor 30. Again the adaptor 30 has a pair of transverse passages 41 through one of which the bolt 42 passes to engage in a selected one of the passages 50.

In the embodiment of FIGS. 14 to 17, the adaptor 30 is cast and welded to the plates 34. Accordingly the flange 35, bolts 42 and nuts 46 have been eliminated.

In addition to the modification of the mounting 34 and adaptor 30, the assembly 10 includes a fertilizer boot (tube) 57 that projects downwardly to the rear of the blade 47. The boot 57 is attached to the lower end of the tube 60 to which fertilizer is delivered. Accordingly the fertilizer is delivered to a position behind the blade 47. Attached to the boot 57 is a tube 58 that can be used to deliver a liquid.

Forward of the boot 57 is a shield 59 that is rearwardly concave so as to protect the boot 57. Essentially the boot 57 is located behind and between the edge portions of the shield 59. The shield 59 is secured to the lower end of the tine 14 by means of the bolts 51 that hold the adaptor 18 to the tine 14.

In the embodiment of FIGS. 18 to 21, the mounting 24 provides a socket 61. The socket 61 has an upwardly oriented passage 67 that receives the stem 44 of the closing tool 31. The socket 61 is at least partly formed by pair of transverse flanges 63 and 65 fixed to and extending between lower portions of the two plates 34.

Holes 64 are formed in both plates 34 to provide for the passages 67. The bolt 66 engages a selected one of the passages 50, with the height of the closing tool 31 being adjusted by engagement of the bolt 66 in one of the holes 64, and a selected one of the passages 50.

Figure 31:
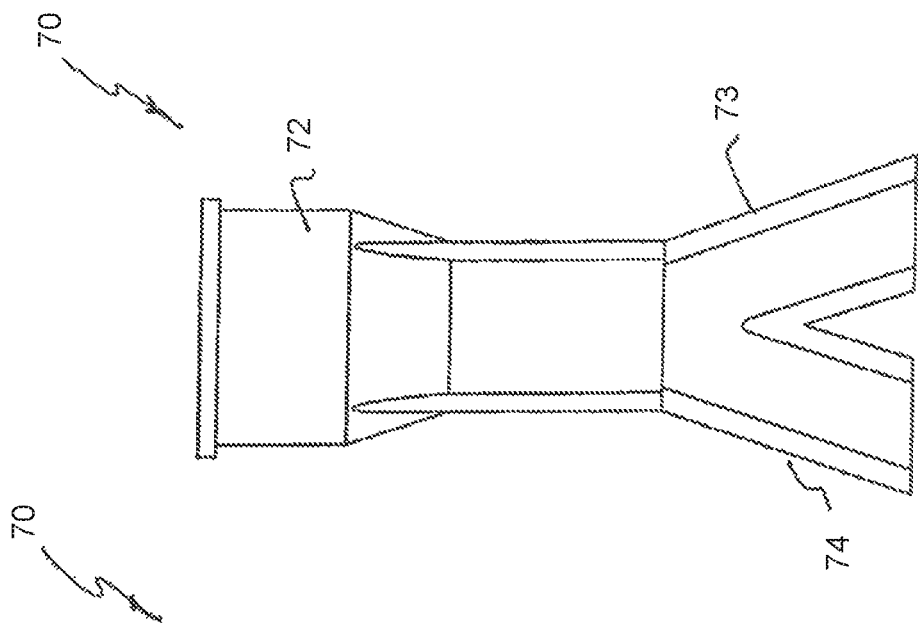
FIG. 31 is a schematic rear elevation of the seeding tube of FIG. 29.
Figure 30:
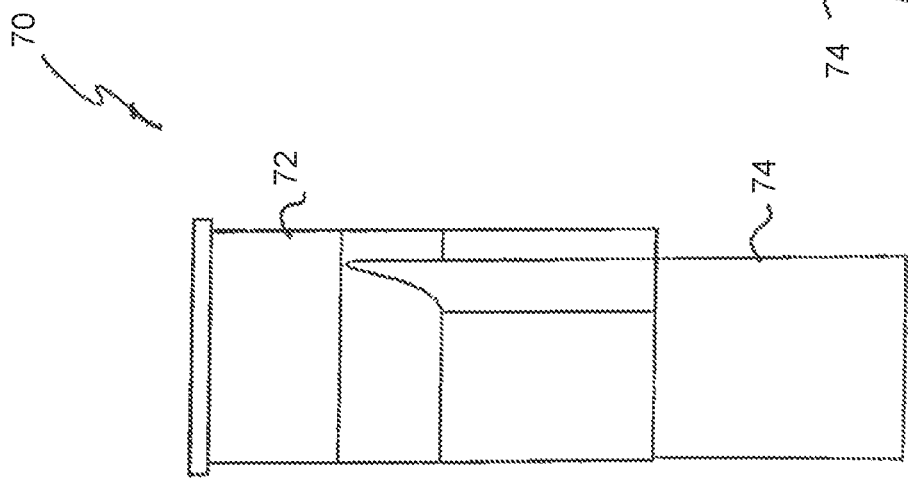
FIG. 30 is a schematic side elevation of the seeding tube of FIG. 29.
Figure 29:
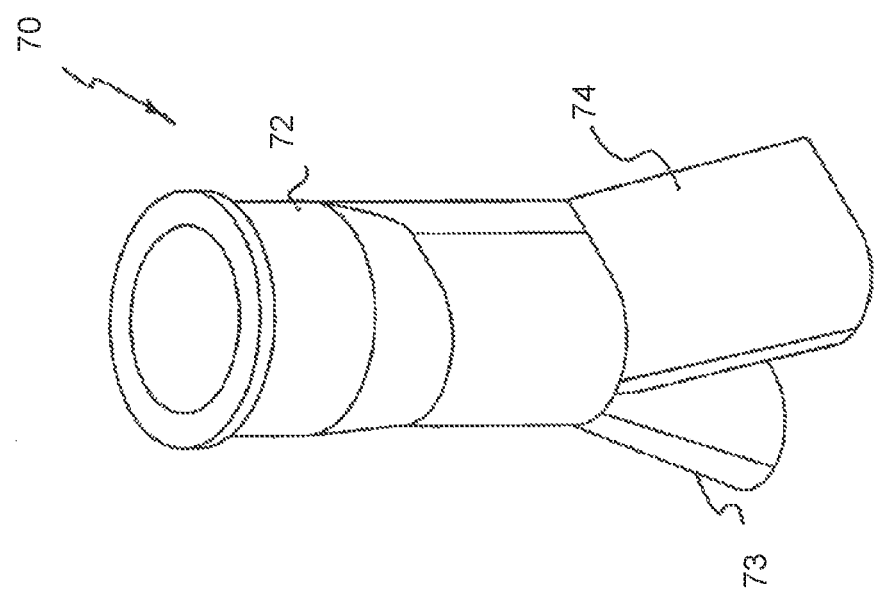
FIG. 29 is a schematic isometric view of a modification of the seeding tube of FIG. 1.

In FIGS. 29, 30 and 31, there is schematically depicted a modification of the seed delivery tube 32 described with reference to FIG. 1. In this embodiment the seed delivery tube 32 is provided with "boot" 70, the boot 70 including an upper inlet tube portion 72 that may be integrally formed or attached to the seed delivery tube 32. The seed delivery tube 32 of FIG. 1 is attached to the lower end of a primary delivery tube 71 (FIG. 1). In this embodiment the boot 70 may also be attached to the lower end of the tube 71. The upper tube portion 72 receives seed from the tube 71 with the seed then being delivered to two outlets 73 and 74. Accordingly the seed is delivered in two generally parallel rows as opposed to a single row.

In FIGS. 32 to 34, there is schematically depicted a modification of the blade 47 of FIGS. 6 and 7.

In FIGS. 32 to 34, the blade 47 is provided with a blade attachment 78. The attachment 78 has a mounting portion 77 provided with an aperture through which the lower end of the blade 47 projects. The blade 47 has slots 75 formed in its side surfaces 76 within which the mounting portion 77 engages to securely attach the blade attachment 78 to the blade 47.

The blade attachment 78 has a forwardly facing flange 79 that is downwardly sloping relative to the forward direction of travel 12. Preferably, the flange 79 has a generally planar upper face 80 to which there is attached wear parts 81 that are of a harder material than the flange 79.

In FIGS. 35 to 50 there is schematically illustrated modifications of the assembly 10 of FIGS. 1 and 2.

The digging blade assembly 17 of FIGS. 38 to 42 has two apertures 100 in the adaptor 18, extending in the direction 12, through which bolts 102 pass. The bolts 102 also passing through a lower portion 103 of the tine 14 so as to secure the adaptor 18 thereto. The bolts 102 are located in a plane generally parallel to the direction 12.

The adaptor 18 has a passage 104 that enables the adaptor 18 to provide a socket within which an upper portion 105 of the blade (tool) 19 can be located.

The upper portion 105 has a plurality of slots 106 located on both lateral faces of the portion 105, with the slots 106 being arranged in pairs, each pair including a slot 106 on opposite lateral faces of the upper portion 105. The pairs of slots 106 are arranged at intervals along the length of the portion 105 so that the slots 106 are located at various heights.

The adaptor 18 also has a pair of passages 101 that are located at positions spaced along the passage 104, and are aligned with the apertures 100 so that an operator has access to the bolts 102 when the blade 19 is removed.

The adaptor 18 further has a slot 108 that extends transverse of the portion 105 and that extends to the passage 104. The slot 108 receives a clip 109, the clip 109 having a pair of pin portions 110 that engage within a pair of the slots 106 of the portion 105, to secure the blade 19 at a desired position in the adaptor 18. In that regard it should be appreciated the blade 19 may be moved along the passage 104 to locate a selected pair of the slots 106 aligned with the slot 108, and thereby adjust the depth at which the blade 19 penetrates the soil.

The clip 109 is resiliently deformed when inserted in the slot 106 so as to frictionally engage the adaptor 108 and/or the portion 105. As a particular example, when inserting the clip 109 the pin portions 110 could be resiliently deflected towards each other being inserted through the adaptor 108, so as to be resiliently urged apart to engage the adaptor 18.

The clip 109 is removed and inserted in a direction having a major component parallel to the direction 12.

The clip 109 is of a "U" shaped configuration so as to provide for easy gripping of the end of the clip 109 to facilitate insertion and removal.

In the closing tool assembly 29 of FIGS. 43 to 47, the closing tool 31 has a plurality of transverse slots and ridges 120 that extend transverse of the direction 12, and are preferably formed in a forward facing surface of the stem 44, that is a surface facing in the direction 12. To engage with the slots and ridges 120, the adaptor 30 is also provided with a plurality of slots and ridges 121 that match the slots and ridges 120 so that they can matingly engage. However the stem 44 is displaceable from an engagement position with respect to the slots and ridges 120, 121, and a position of non-engagement. Preferably, closing tool 31 is angularly movable in a direction 122 from an engaging position to a disengaging position. The closing 31 would be moved in an opposite direction to cause engagement of the slot and ridges 120, 121.

To retain the closing tool 31 in the engaged position there is provided a transverse bolt 123 that passes through transverse passages 124 in the adaptor 30. When inserted in the adaptor 30, the bolt 123 abuts a rear face of the stem 44 so that the slots and ridges 121 engage with the slot and ridges 121.

The closing tool 31 fixed to the mounting 24, bolts 37 pass through the flange 35 as previously described.

Preferably, the lower seed bed forming portion 43 is attached to the stem 44 by means of a transverse bolt or pin 125 to provide for replacement of the portion 43. Preferably, the portion 43 is provided with a wear plate 126 that engages the soil to form the seed bed. The plate 126 faces downwardly and in the direction 12.

To aid in mounting the boot 57 there is provided a coupling 131.

Attached to the rear of the coupling 131 is a boot mounting and shield 130. The mounting and shield 130 engages the coupling 131, fixed to the mounting 103 by means of bolts 132. The coupling 131 has upwardly extending slots 133 within which flanges 134 of the mounting and shields 130 are slidably engaged to secure the mounting and shield 130 thereto. The mounting and shield 130 also has transverse passages 135 through which a pin 136 passes to fix the mounting and shield 130 to the coupling 131. In this respect it should be appreciated a series of passages 135 are provided so that the height (depth) of the mounting and shield 130 can be adjusted by having the pin 136 pass through the desired passage 135.

The pin 136 is also provided with a clip 137 that fixes the boot 57 to the mounting and shield 130. The mounting and shield 130 also has a rear socket portion 138 within which an upper portion of the boot 57 is received.

Preferably, there is secured to the boot 57 a tube 59 as discussed previously.

In the embodiment of FIGS. 51, 52 and 53, the shield 130 is provided with two transverse passage 135 to provide for the selection of two different height settings, with the shield 130 also provided with a ridge 39 to at least aid in protecting the pin 13 and clip 137. In FIGS. 54 to 58 there is schematically depicted a closing tool assembly 150 that is a modification of the previous closing tool assemblies.

In the embodiments of 54 to 58, the closing tool assembly 150 includes an adaptor 151 that attaches the assembly 150 to the tine 14 previously described.

The closing tool 152 includes a stem 153 and a seed forming bed portion 154.

The stem 153 has an upper portion 155 with a plurality of transverse slots 156, and a plurality of transverse passages (holes) 157, that provide for the mounting of the stem 153 in the adaptor 151.

The adaptor 151 has two sets of passages 158, with each set of passage 158 including two passages that are spaced from each other in the direction of travel of the assembly 150, with the passages 158 including a forward passage 158 and a rear passage 158. The rear passage 158 is slightly higher than the front passage 158.

A pin of "U" configuration having a pair of arms 160 is inserted in one of the sets of the passages 158 to locate the stem 153 at a desired height. The pin 159 is not only engaged in a selected one of the sets of passages 158, but also engaged in a selected slot 156 and passage 157.

The upper end of the stem 153 is provided with a hook 161 that can be used to aid in moving the stem 153 vertically to align the passages and slots 156, 157 and 158. In this respect it should be appreciated the adaptor 151 has an upwardly extending passage 161 within which the stem 153 projects to slidably engage the adaptor 151 so as to be guided thereby in upward movement or downward movement of the stem 153. This movement is generally linear.

The adaptor 151 also has a pair of passages 162 through which fasteners 163 pass to engage nuts 164 to secure the adaptor 151 to the abovementioned tine 14.

The lower end of the stem 153 is configured to provide for mounting of the seed bed forming portion 154. In this embodiment the lower end of the stem 153 is provided with a flange 165 that has a transverse passage 166. The seed bed forming portion 154 has a flange 167, to abut the flange 165, with the flange 167 having a passage 168 that is aligned with the passage 166. A threaded fastener 169 is inserted through the aligned transverse passages 166 and 168 to secure the seed bed forming portion 154 to the stem 153. The threaded fastener 169 engages a nut 170. The flanges 165 and 167 abut to maintain the portion 168 correctly positioned and oriented.

In FIGS. 59 to 61 there is schematically depicted a modification of the digging blade (tool) 19 of the previous embodiments. In this embodiment the blade 19 has side surfaces 171 with upwardly oriented slots 172 that inhibits smearing of the soil.

The upper portion 105 is provided with a hook 173 that aids a user in gripping the blade 19 to move the blade 19 relative to the adaptor 18. The hooks 161 and 173 can be used to remove the pins 159.

The above described preferred embodiments have a number of advantages including having the passages 41 and 45 of the closing tool 31 and the passages 53 and 55 of blade 47 transverse relative to the direction 12. This enables insertion of the bolts 42 and 54 transverse relative to the direction 12. By having the bolts 42 and 54 transversely positioned, the heads of the bolts and the nuts engaged with the bolts are accessible, and can be manipulated by power tools. A further advantage is that forces applied to the tool 31 and blade 47 by the soil are directly transferred to supporting structure, such as the adaptors 18 and 30, and not through the bolts 42 and 54. The bolts 37 and 52 are protected by the closing tool 31 and blade 19.

The above embodiments also have the advantage that the closing tool is easily adjusted in respect of height (soil penetration depth), while the fertiliser boot 57 is easily replaced by operation of the clip 37. Still further the fertiliser boot 57 can be adjusted in height by means of the pin 136 engaging in a selected pair of the passages 135. Still further, the digging blade is easily mounted and replaced by removing and inserting the clip 109.

In operation of a plough having a plurality of the digging assemblies 10, the plough frame is pulled to the forward direction by a prime mover such as a tractor. The digging assemblies are located at spaced positions transverse of the direction 12, with the digging assemblies forming a trough or slot in the soil layer by having the digging blade engage the soil. Each closing tool assembly engages soil around the slot, and forms a seed bed by having the closing tool move the soil to at least partly close the slot. The closing tool forms a seed bed, at an accurate distance below the soil level, onto which a seed is delivered via the seeding boot. Fertiliser can also be delivered to the slot, just behind the digging blade so that the fertiliser is covered with soil by the closing tool. Accordingly, the digging assembly, closing tool assembly and press wheel are aligned in the direction of travel 12. Additionally the fertiliser tube and seeding bed are also in that alignment with the closing tool assembly and digging assembly. The press wheel ensures the seed is covered with soil.

The invention claimed is:

1. In combination a plough tool, adaptor and pin, with the pin engaging the adaptor and tool to secure the tool to a plough frame, the plough tool to be moved through a soil layer in a forward direction by being attached to the plough frame, the tool being constructed so as to have a forward facing surface to engage the soil layer, to prepare the soil layer for the delivery of seed and/or fertiliser to the soil layer, the tool having an upper stem with a pair of lateral faces each having a plurality of slots extending generally in said forward direction, the slots being arranged in pairs, each pair consisting of one of the slots from each of the lateral faces, and wherein the pairs of slots are arranged at locations along the tool to provide for height adjustment of the tool and an adaptor to attach the tool to the plough frame, and wherein the adaptor has an upwardly extending passage into which the tool stem projects, with the adaptor also having at least one pin passage extending substantially in said forward direction that receives the pin that engages a selected pair of the slots to retain the tool at the desired height by insertion and removal of the pin in a pin direction that is parallel to said forward direction.

2. The combination of claim 1, wherein the adaptor has an adaptor fixing passage extending substantially in said forward direction that receives a fastener to secure the adaptor to the plough frame, the fixing passage extending from said upwardly oriented passage.

3. The combination of claim 1, wherein the pin passages extend substantially in said forward direction, with the clip inserted in said pin receiving passages by movement in a direction substantially opposite said forward direction.

4. The combination of claim 2, wherein the pin is inserted in the selected slots by movement in a direction substantially opposite said forward direction.

5. The combination of claim 1, wherein the adaptor has at least a pair of pin passages extending substantially in said forward direction that receive at least a pair of pins that engage a selected pair of the slots to retain the tool at the desired height by insertion and removal of the pins in a pin direction that is parallel to said forward direction.

* * * * *